US011019959B2

(12) United States Patent
Patterson

(10) Patent No.: US 11,019,959 B2
(45) Date of Patent: Jun. 1, 2021

(54) TIMER TRANSFER SYSTEM AND METHOD FOR FOOD HOLDING DEVICES

(71) Applicant: Cleveland Range, LLC, New Port Richey, FL (US)

(72) Inventor: Nicholas M. Patterson, Odesa, FL (US)

(73) Assignee: CLEVELAND RANGE, LLC, New Port Richey, FL (US)

( * ) Notice: Subject to any disclaimer, the term of this patent is extended or adjusted under 35 U.S.C. 154(b) by 265 days.

(21) Appl. No.: 16/185,585

(22) Filed: Nov. 9, 2018

(65) Prior Publication Data

US 2020/0146504 A1  May 14, 2020

(51) Int. Cl.
| | | |
|---|---|---|
| A47J 36/00 | (2006.01) | |
| A47J 36/32 | (2006.01) | |
| A47J 36/24 | (2006.01) | |
| A47J 39/00 | (2006.01) | |
| G06F 3/0488 | (2013.01) | |
| G06F 3/0482 | (2013.01) | |

(52) U.S. Cl.
CPC ......... *A47J 36/321* (2018.08); *A47J 36/2483* (2013.01); *A47J 36/32* (2013.01); *A47J 39/006* (2013.01); *G06F 3/0482* (2013.01); *G06F 3/04886* (2013.01); *A47J 36/24* (2013.01)

(58) Field of Classification Search
CPC .......... A47J 36/24; A47J 36/32; A47J 36/321; A47J 39/006; A47J 27/62
USPC .......................................... 99/448, 468, 483
See application file for complete search history.

(56) References Cited

U.S. PATENT DOCUMENTS

| | | | | |
|---|---|---|---|---|
| 8,695,489 B2 * | 4/2014 | Ewald | ................... | A47J 39/006 99/483 |
| 2004/0056761 A1 * | 3/2004 | Vaseloff | ................ | A47J 39/006 340/309.16 |
| 2005/0216349 A1 * | 9/2005 | Vaseloff | ............... | G06Q 10/087 705/15 |
| 2007/0062379 A1 * | 3/2007 | Pardoe | .................... | A47J 36/32 99/331 |
| 2009/0266244 A1 | 10/2009 | Maciejewski et al. | | |
| 2011/0083564 A1 * | 4/2011 | Kirby | .................... | A47J 39/006 99/468 |
| 2015/0327726 A1 * | 11/2015 | Betzold | ................... | A47J 39/02 426/231 |
| 2017/0065117 A1 * | 3/2017 | Reese | .............. | G06Q 10/06316 |
| 2017/0290466 A1 * | 10/2017 | Lundberg | .............. | A47J 39/006 |
| 2018/0220841 A1 | 8/2018 | Patterson et al. | | |

OTHER PUBLICATIONS

International Preliminary Report on Patentability (IPRP) dated Apr. 21, 2020 for PCT application No. PCT/US2018/060019.

(Continued)

*Primary Examiner* — Reginald Alexander
(74) *Attorney, Agent, or Firm* — Ohlandt, Greeley, Ruggiero and Perle, LLP

(57) ABSTRACT

A system for storing food products at predetermined temperatures includes a food product receiving holding cabinet, a first storage bin in the holding cabinet for receiving a tray, a temperature control device that is in thermal communication with the tray, and a controller that transfers a selected timer by touching a user interface of the holding cabinet, thereby designating the selected timer for transfer to be associated with the first storage bin.

17 Claims, 14 Drawing Sheets

(56) References Cited

OTHER PUBLICATIONS

International Search Report dated Jan. 29, 2019 for PCT application No. PCT/US2018/60019.
Written Opinion dated Jan. 29, 2019 for PCT application No. PCT/US2018/060019.

* cited by examiner

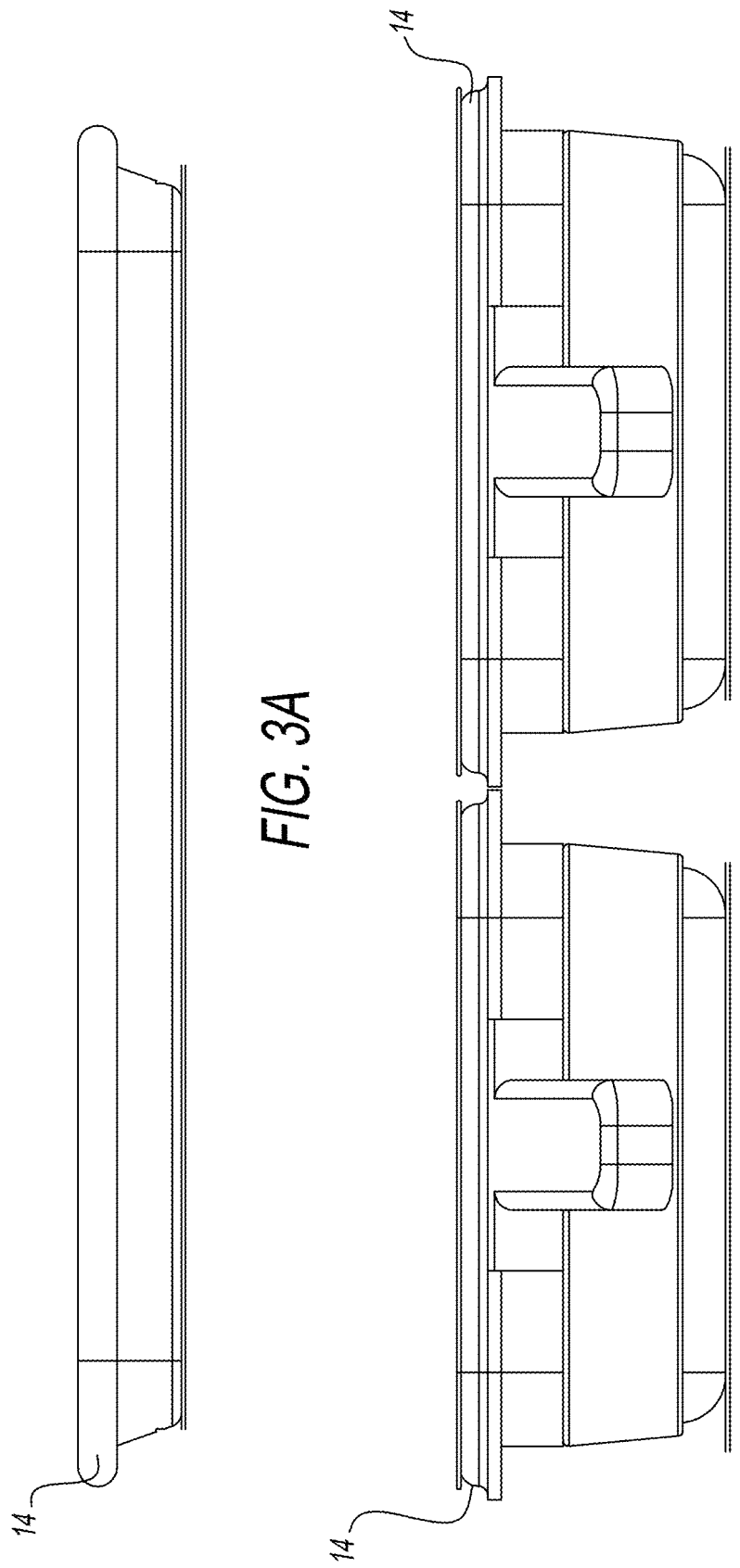

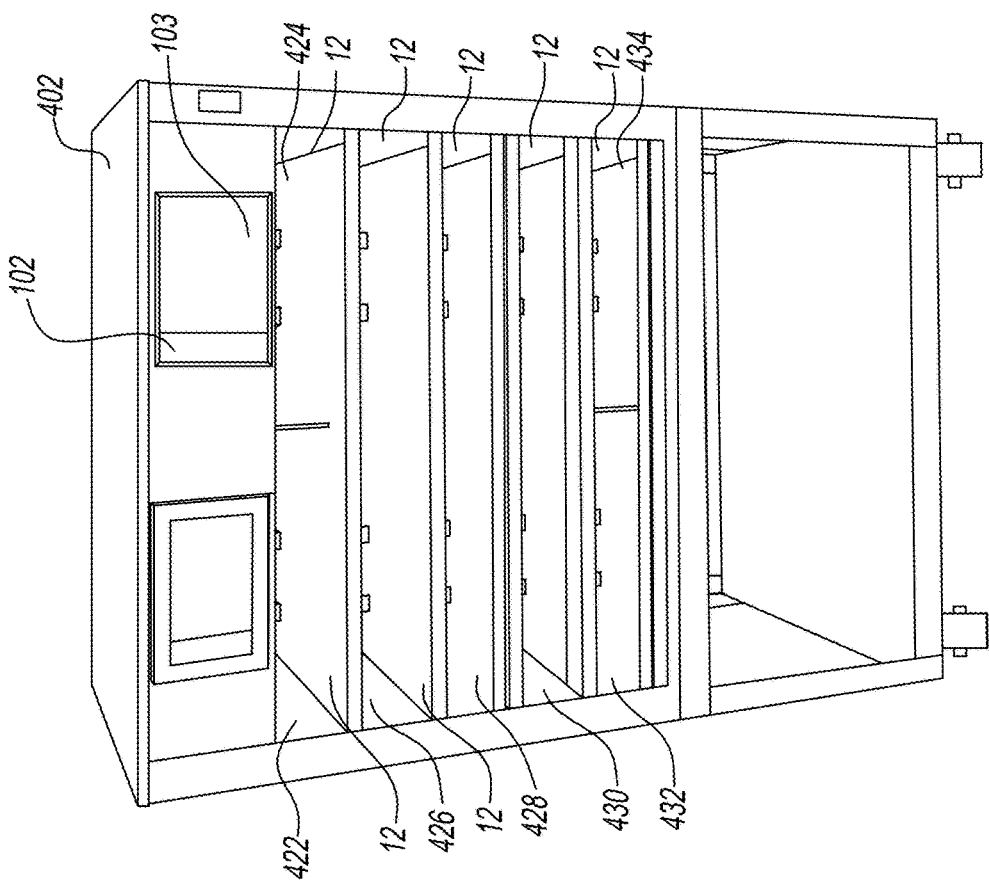
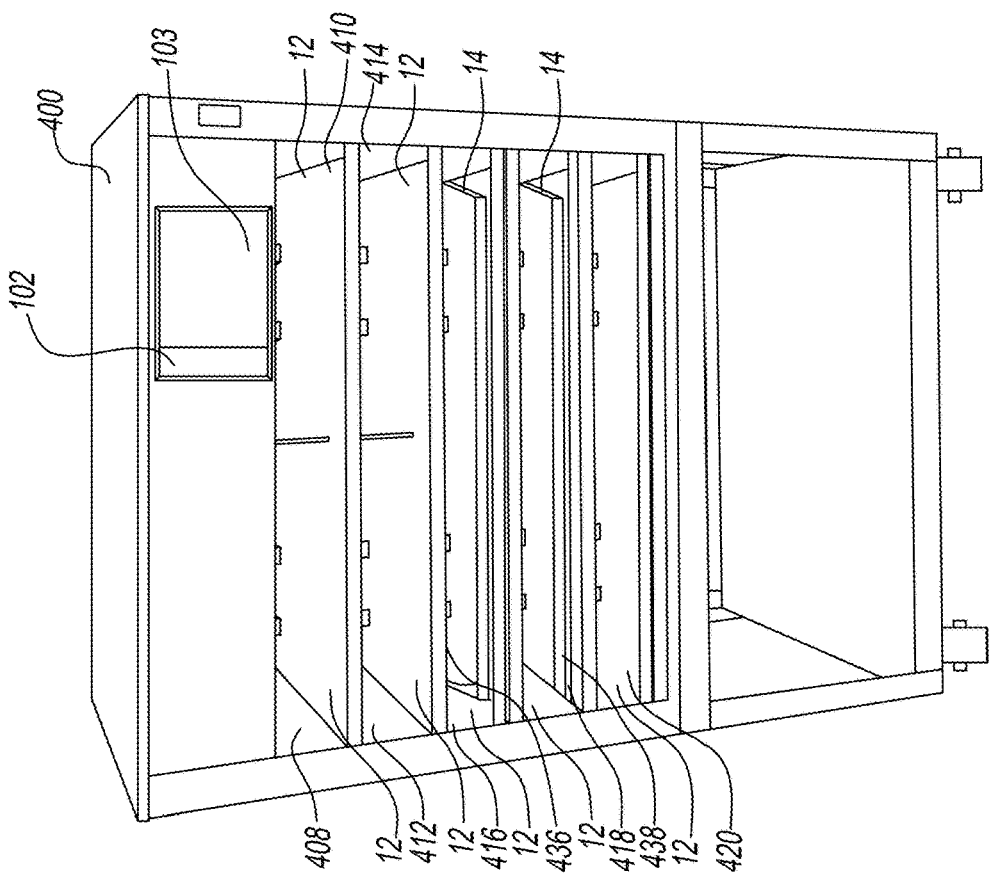
FIG. 4A

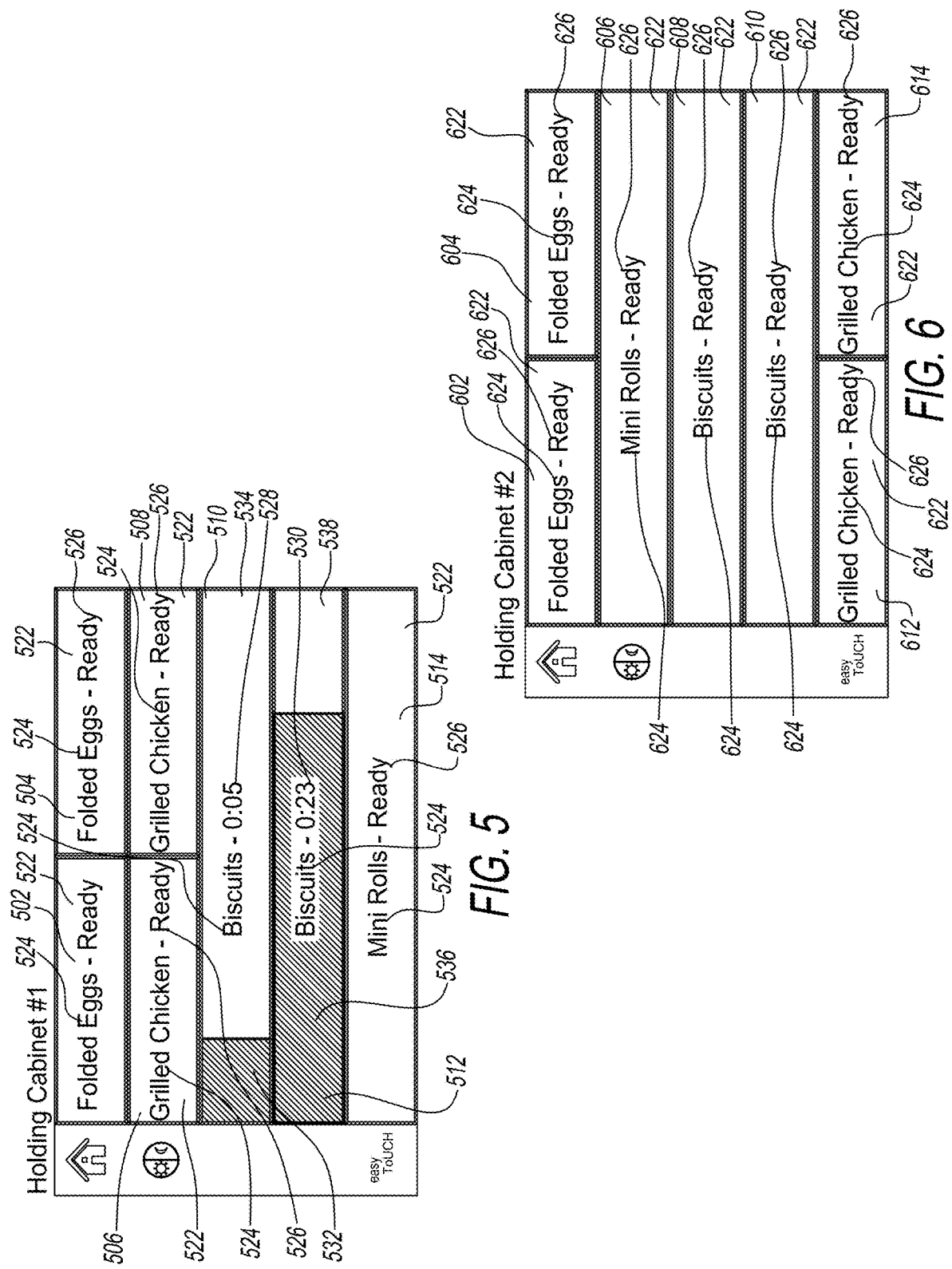

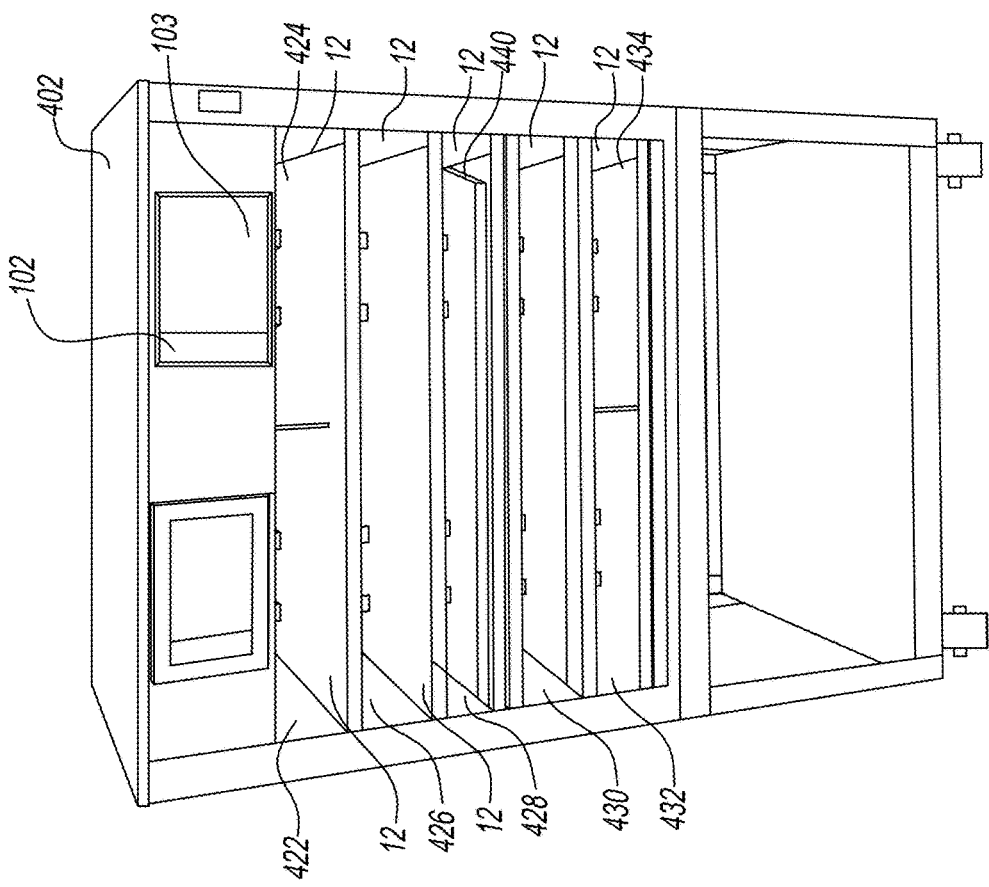
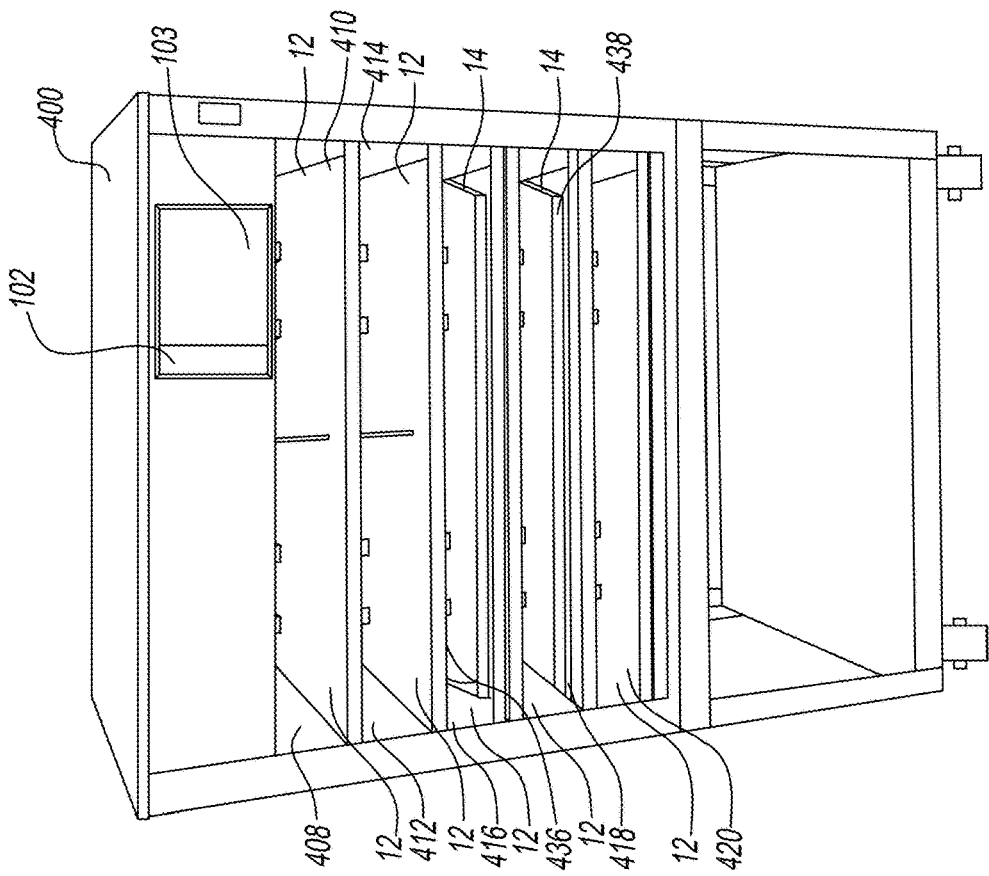
FIG. 7A

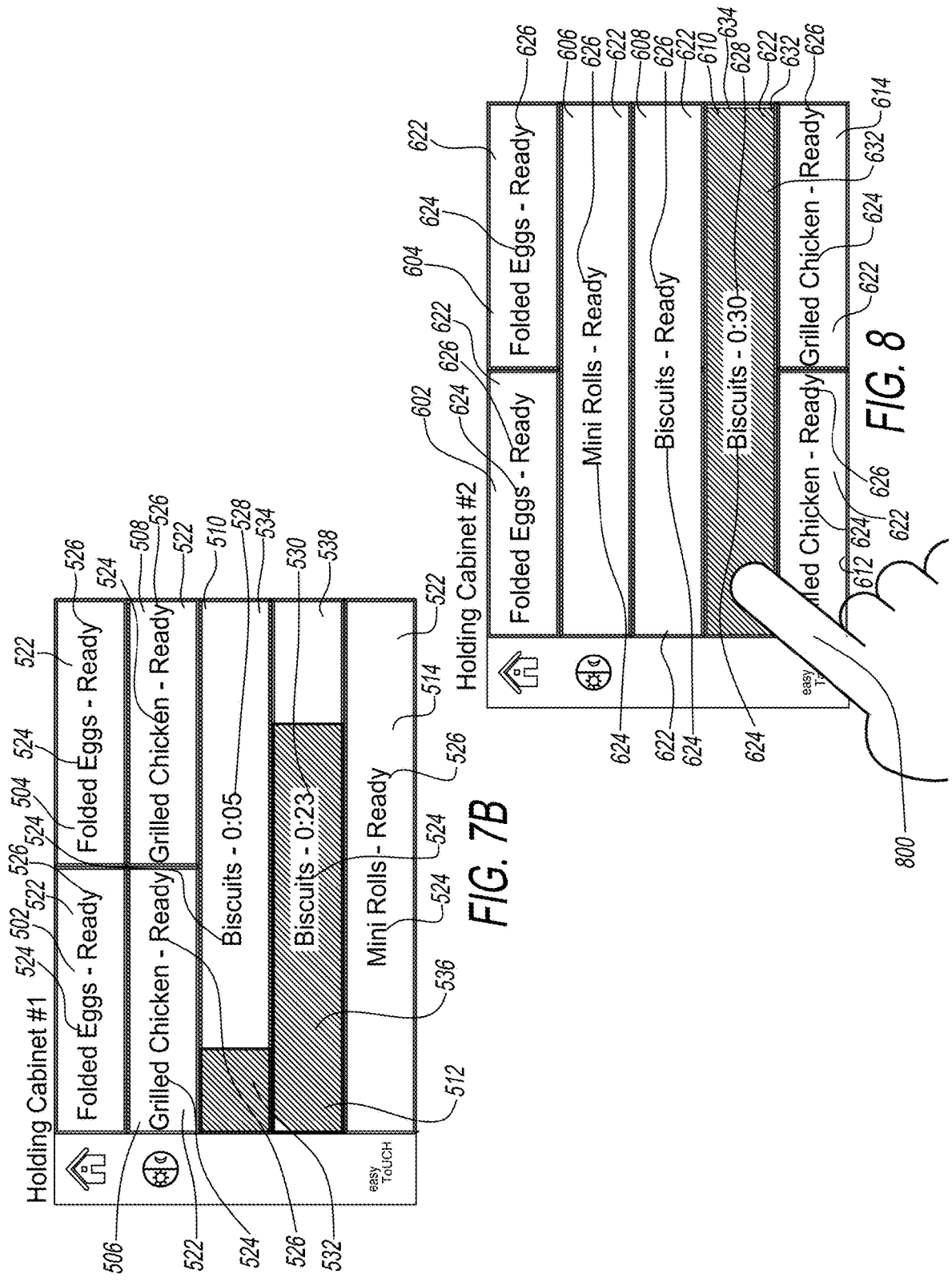

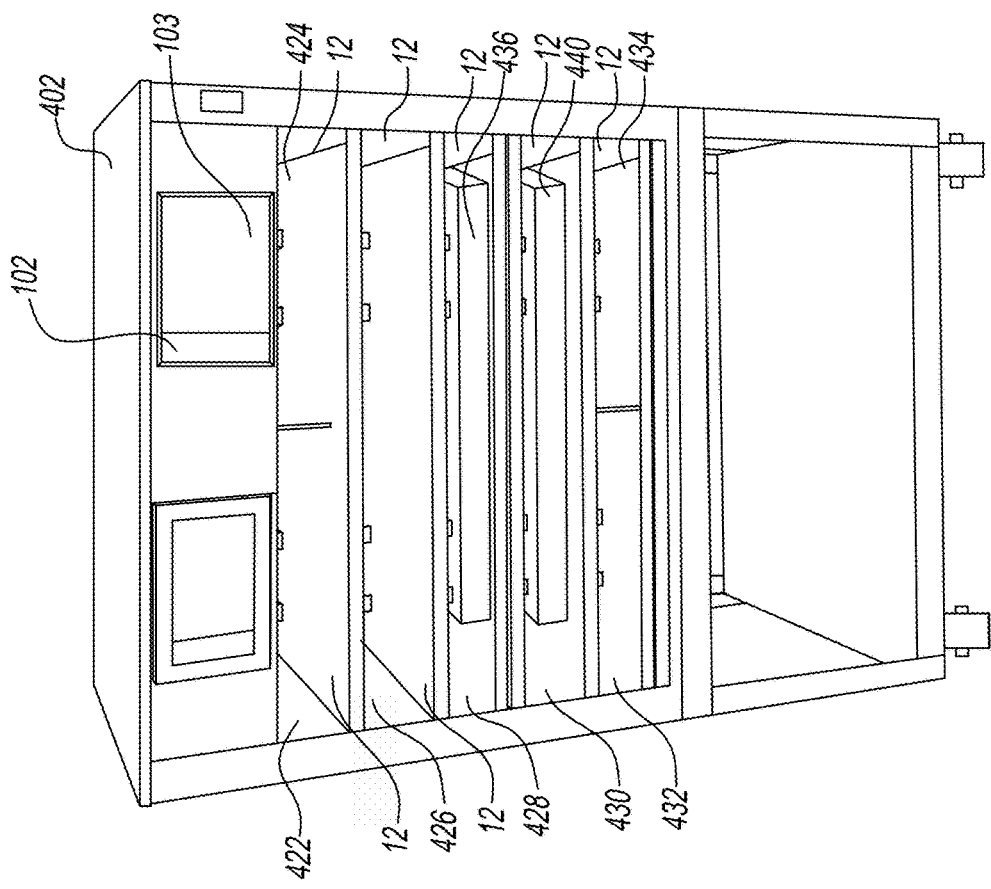
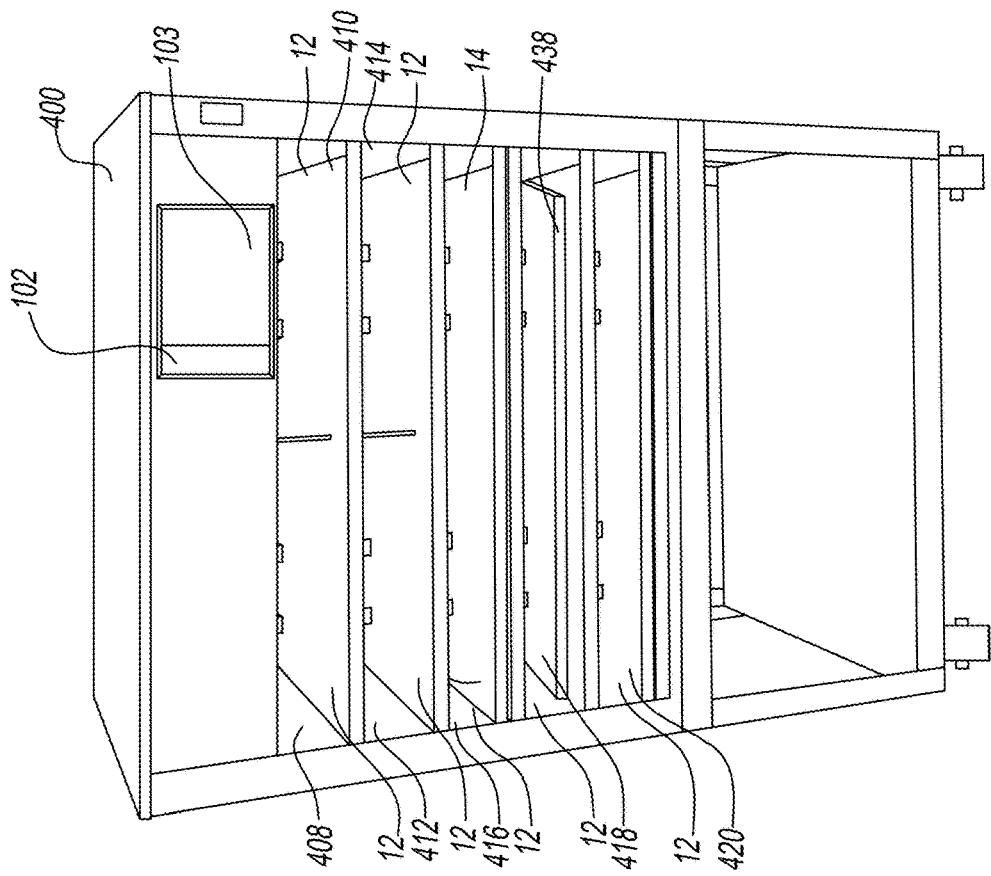
FIG. 9A

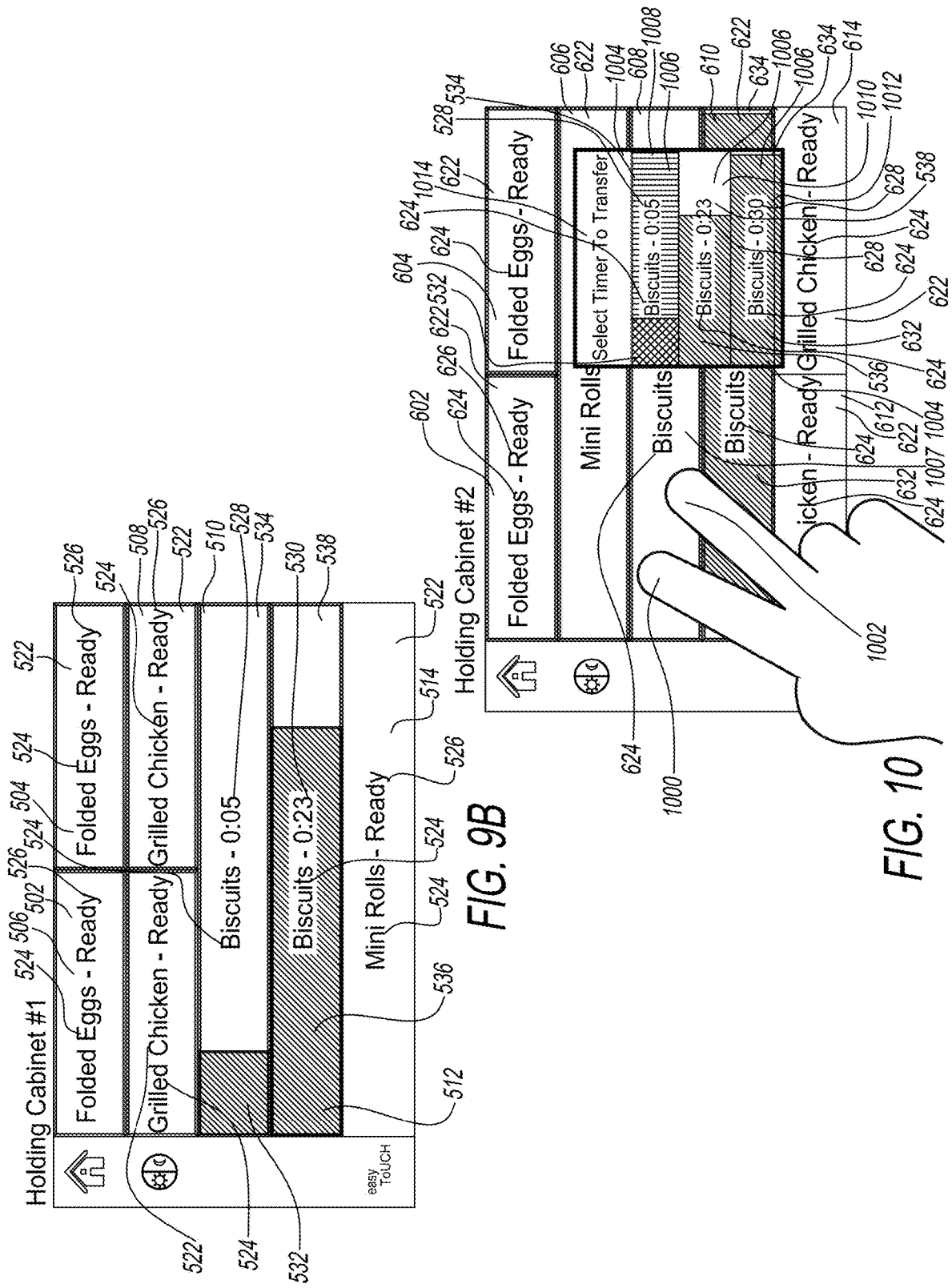

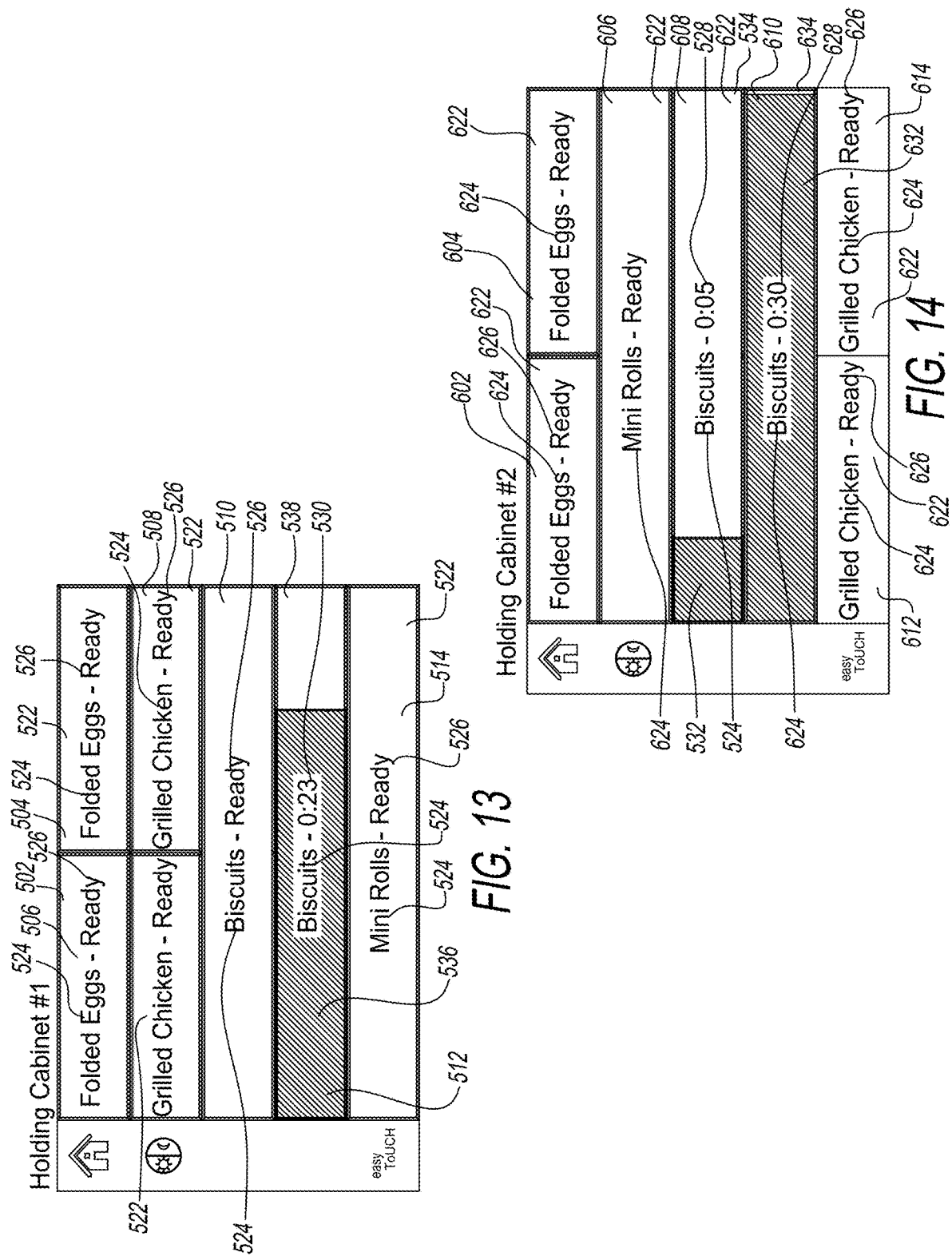

TIMER TRANSFER SYSTEM AND METHOD FOR FOOD HOLDING DEVICES

BACKGROUND OF THE DISCLOSURE

1. Field of the Disclosure

The present disclosure relates to devices for holding food products at desired temperatures while they are waiting to be served to a customer. More particularly, the present disclosure relates to devices and associated methods utilized in a hot food holding cabinet to allow operators to transfer an active holding timer in a network connected system of hot food holding cabinets.

2. Description of the Related Art

One of the major challenges in the commercial foodservice industry is serving high quality food at the expected speed of service. One way to serve high quality food at the speeds that customers expect, is to cook food products ahead of the time they are ordered and then hold the food in a hot holding cabinet. Varying technologies are available to hold this food from basic hot shelves up to infrared lamps and convective airflow. The hot holding cabinets preserve the quality of the food allowing great quality food to be served at the pace customers expect.

These hot holding cabinets generally have timers that tell the users when food is too old to meet quality standards and should be discarded. Pans of food are commonly moved from cabinet to cabinet or from one slot to another within the same holding cabinet. Expensive methods exist in automatically sensing where these pans are and moving the timers. Inexpensive methods also exist but require many button presses, press-and-hold mechanics, and other complicated and time consuming methods for transferring pan timers from pan slot to pan slot.

Accordingly, there is a need to address these disadvantages of currently available systems.

SUMMARY OF THE DISCLOSURE

A system for storing food products at predetermined temperatures is provided that includes a food product receiving holding cabinet, a first storage bin in the holding cabinet for receiving a tray, a temperature control device that is in thermal communication with the tray, and a controller that transfers a selected timer by touching a user interface of the holding cabinet, thereby designating the selected timer for transfer to be associated with the first storage bin.

A method for a system for storing food products at predetermined temperatures is also provided that includes providing a food receiving holding cabinet, a storage bin in the food receiving holding cabinet for receiving a tray, and a temperature control device in thermal communication with the tray, and transferring a selected timer by touching the receiving holding cabinet, thereby designating the selected timer for transfer to be associated with the storage bin.

BRIEF DESCRIPTION OF THE DRAWINGS

FIGS. 3A and 3B are side view of trays that are used in the cabinet of FIGS. 1A, 1B and 2.

FIG. 4A are top, front perspective views of a first holding cabinet and a second holding cabinet having the system and method for time transfer of the present disclosure with the first holding cabinet holding two trays.

FIG. 5 is a screenshot of an interface of the first holding cabinet illustrating the system and method for time transfer.

FIG. 6 is a screenshot of an interface of the second holding cabinet illustrating the system and method for time transfer.

FIG. 7A are top, front perspective views of the first holding cabinet and the second holding cabinet of FIG. 4A with the first holding cabinet holding two trays and the second holding cabinet holding one tray.

FIG. 7B is a screenshot of the interface of the first holding cabinet illustrating the system and method for time transfer.

FIG. 8 is a screenshot of the interface of the second holding cabinet illustrating the system and method for time transfer.

FIG. 9A are top, front perspective views of the first holding cabinet and the second holding cabinet of FIG. 4A with the first holding cabinet holding one tray and the second holding cabinet holding two trays.

FIG. 9B is a screenshot of the interface of the first holding cabinet illustrating the system and method for time transfer.

FIG. 10 is a screenshot of the interface of the second holding cabinet illustrating the system and method for time transfer.

FIG. 13 is a screenshot of the interface of the first holding cabinet illustrating the system and method for time transfer.

FIG. 14 is a screenshot of the interface of the second holding cabinet illustrating the system and method for time transfer.

DETAILED DESCRIPTION OF THE DISCLOSURE

Figure 1B:
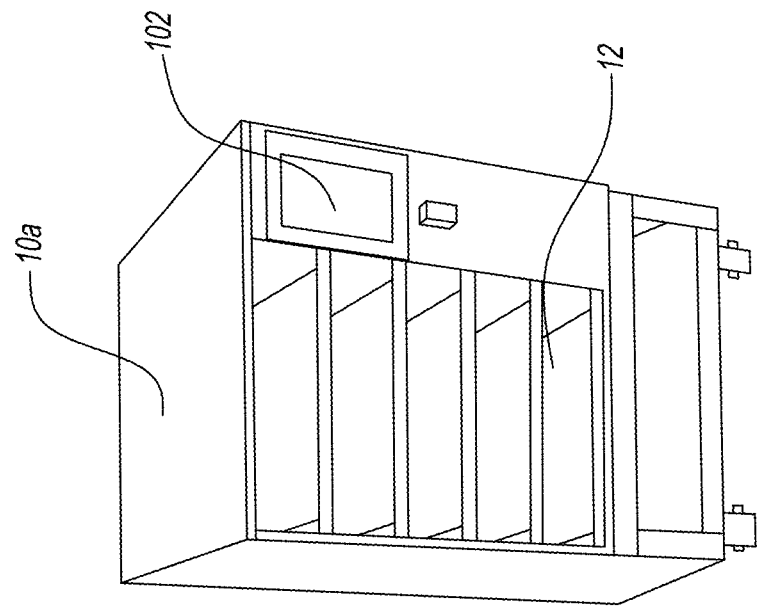
FIG. 1B is a top, front perspective view of an alternative cabinet having the system and method for time transfer of the present disclosure.
Figure 1A:
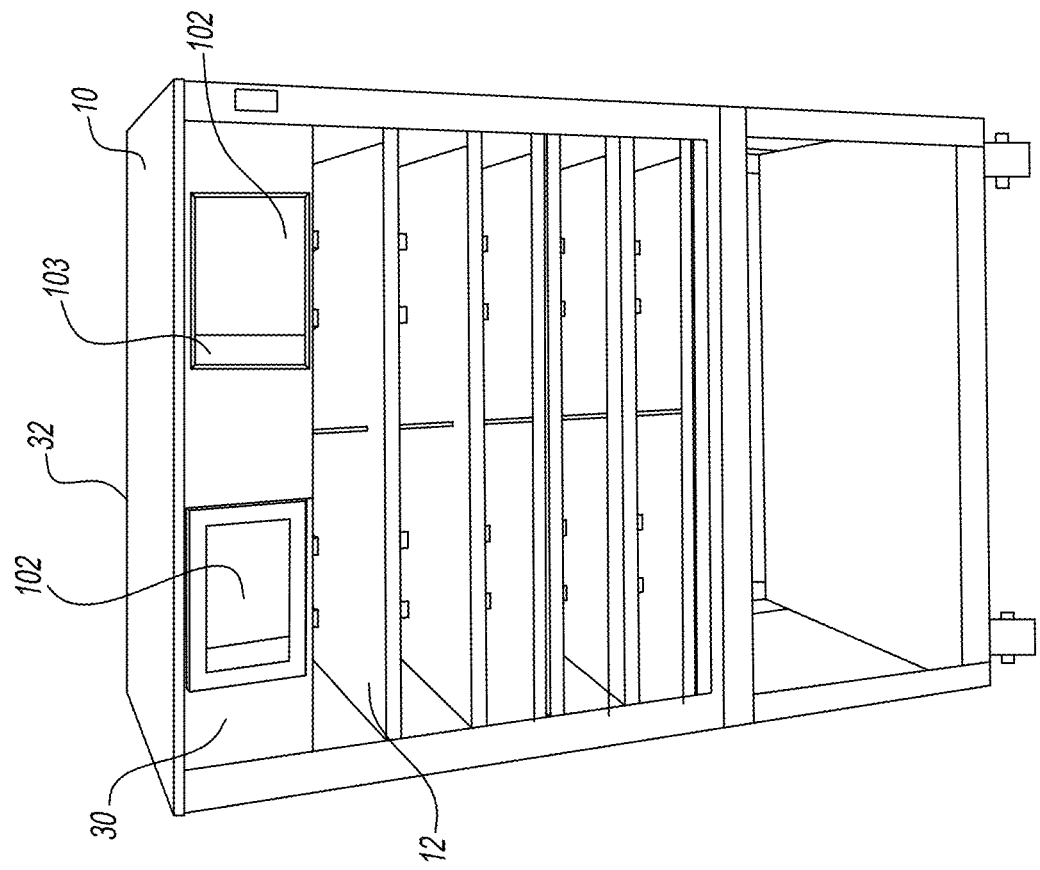
FIG. 1A is a top, front perspective view of a cabinet having a system and method for time transfer of the present disclosure.

Referring to FIG. 1A, cabinet 10 of the present disclosure is shown. Cabinet 10 is a hot food holding cabinet in a network connected system of hot food holding cabinets. The network connected system of hot food holding cabinets includes cabinet 10 and one or more other hot food holding cabinets that are the same or similar to cabinet 10. Users are able to transfer an active holding timer from a sending hot food holding cabinet to a receiving hot food holding cabinet in the network connected system of hot food holding cabinets. The receiving hot food holding cabinet can be cabinet 10. A user transfers the timer from the sending hot food holding cabinet to cabinet 10 when a tray 14 (FIG. 2) that is associated with the timer is transferred from the sending hot food holding cabinet to cabinet 10. To transfer the timer, the user only has to interact with the receiving hot food holding cabinet, namely, cabinet 10. Prior hot food holding cabinets always required the user to interact with the sending hot food holding cabinet and the receiving hot food holding cabinet by the user touching a button on the sending hot food holding cabinet, then touching a button on the sending hot food holding cabinet to pick what is being sent, then touching a button on a receiving hot food holding cabinet, and then touching a button on the receiving hot food holding cabinet to identify where the tray will be received requiring 4 total touches.

Cabinet 10 of the present disclosure does not require any transfer button from the sending hot food holding cabinet. Because of touchscreen technology of a user interface 102 of cabinet 10 and the ability to sense multiple points, the process of the present disclosure removes the concept of a transfer button and instead utilizes a more convenient "two point touch" to only touch one button, with two fingers, instead of two buttons in series. The process of cabinet 10 of the present disclosure is fast, easy, and intuitive. All that has to be done is grab a tray, walk it to another cabinet (or another bin 12 in the same cabinet 10), put the tray in place, touch user interface 102 with two fingers and pick which timer is desired. Accordingly, the process of cabinet 10 of the present disclosure is touching the touchscreen of user interface 102 twice that is a lot faster and more intuitive than the previously described method that requires four buttons: (1) a button for a transfer button, (2) a button to indicate what to transfer, (3) a button for a receive transfer button, and (4) a button to indicate where to put the transferred product.

Figure 2:
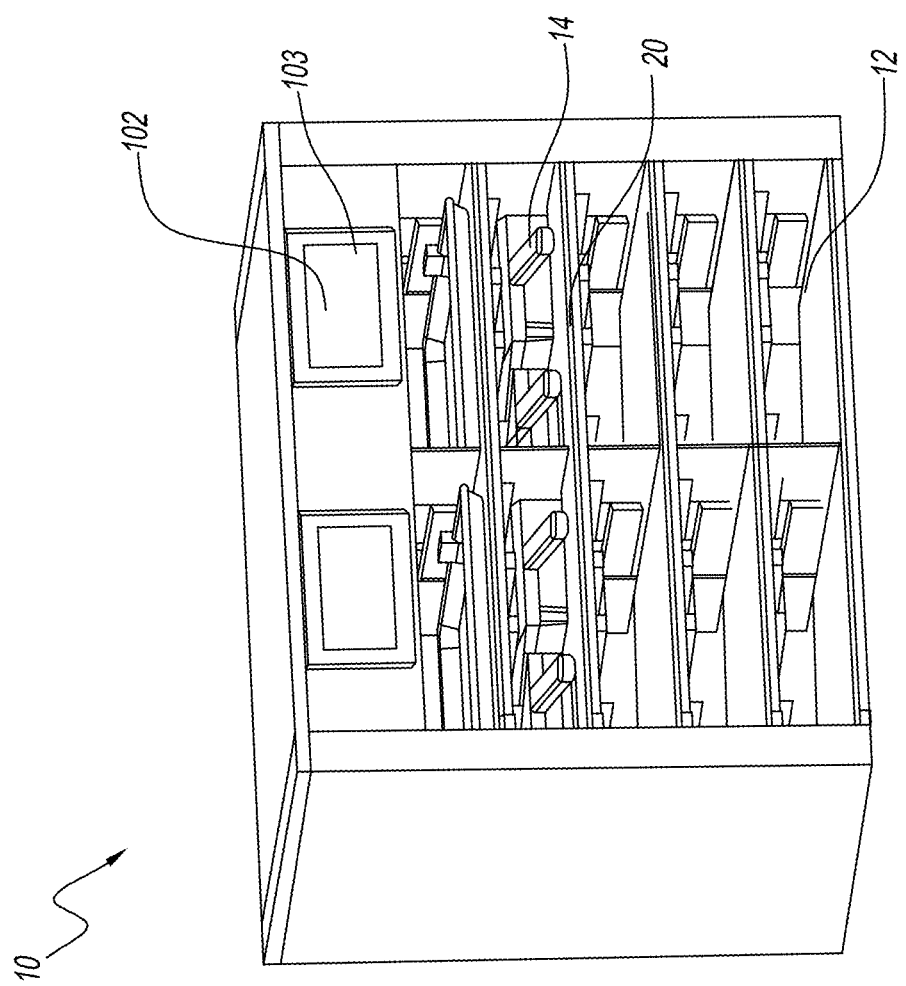
FIG. 2 is a side, perspective view of the cabinet of FIG. 1 having a portion removed and trays positioned therein.

Referring to FIGS. 1A, 2, 3A and 3B, and in particular FIG. 2, cabinet 10 has a plurality of tray storage bins 12. Each of tray bins 12 can receive one or more of trays 14, the latter of which holds one or more food products (not shown). As shown in FIGS. 3A and 3B, trays 14 can either have a shallow profile with relatively long sides (FIG. 3A), or be deep with shorter sides (FIG. 3B). The suitable type of tray 14 will depend on the food product to be stored therein.

In the shown embodiment, cabinet 10 is a cabinet with ten bins 12, in a five row by two wide arrangement where the two wide refers to a specific industry standard pan. Each bin 12 can have space for one or two trays 14. In the embodiment shown in FIG. 1A, for example, top bins 12 each receive a larger tray 14, but the bins lower down each store a narrower tray 14. The present disclosure contemplates cabinets with anywhere from one bin 12, to one or more bins. In one embodiment there are up to and equal to twenty bins 12. In any of these embodiments, bins 12 could fit multiple trays 14. The cabinets may be sized to fit different needs in different areas of the restaurant. For example, in a service area near the front of the establishment, a smaller cabinet with, for example, four bins 12 may be appropriate. In the rear of the establishment, it may be suitable to have a larger cabinet with up to 20 bins. FIG. 1B shows an alternative cabinet 10a that is the same as cabinet 10 except smaller in size than cabinet 10, and, accordingly, the same references numerals are used for the same features.

Referring back to FIG. 2, each bin 12 has a temperature control device such as a heater 20 associated therewith. Heaters 20 can be a number of suitable devices for providing heat to bin 12 and tray 14. Heaters 20 can be inductive, conductive (e.g., heated plates), convective (e.g., hot air flow), radiant (e.g. heat lamps, calorimeter rods), and any combination thereof. The heaters 20 are regulated by either a temperature sensor or a software algorithm, both linked to a processor 108a (FIG. 4B) to achieve desired temperature, as described above. Although the present disclosure is primarily directed to keeping trays 14 at elevated temperatures within bins 12, the devices and methods of the present disclosure could be used to keep trays 14 at ambient temperatures, or to cool them as well. In addition, the term "bin" is used for simplicity, to describe a fully- or semi-enclosed location or zone capable of storing and holding one or more trays.

Cabinet 10 has user interface 102. User interface 102 is a touch screen as is known in the art. One example of a touch screen that is used for user interface 102 is a glass-front projected capacitive touch screen display, for example, manufactured by ThreeFive Corp but user interface 102 could be manufactured by any number of other companies. Cabinet 10 has two user interfaces 102 and cabinet 10a has one user interface 102, however, more than two user interfaces 102 can be used. Cabinet 10 can be modified to have one user interface 102 on a front 30 and one user interface 102 on a back 32 so that the touchscreen of user interfaces 102 can act as a mirror from front to back and users can get food to make sandwiches from both sides. Cabinet 10 can be modified to be a cabinet that is extremely large having both user interfaces 102 on the front with 20 trays and 20 timers for each tray which would be incredibly hard to read on one small screen. The transfer of one of trays 14 can happen within a single cabinet—if it is desirable to move something from the bottom to the top bin 12, but more commonly between cabinets—like a reserve cabinet and the cabinet where the sandwiches are made.

Referring to FIG. 4A, a first holding cabinet 400 and a second holding cabinet 402 are shown. First holding cabinet 400 and second holding cabinet 402 are the same as holding cabinet 10 except first holding cabinet 400 and second holding cabinet 402 have seven bins instead of ten bins, and, accordingly, the same references numerals are used for the same features.

Figure 4B:
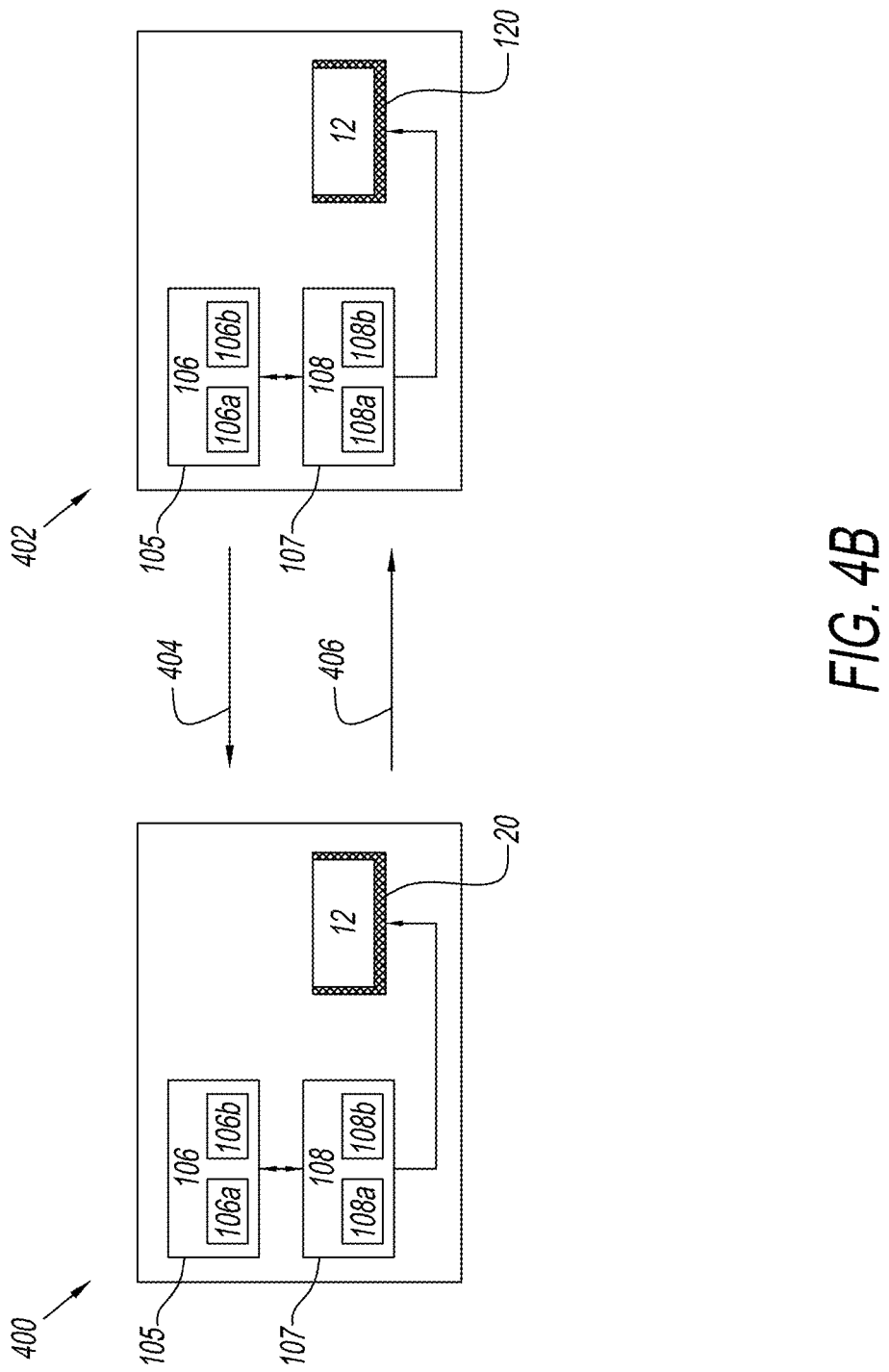
FIG. 4B is a schematic drawing of the first holding cabinet and the second holding cabinet in communication with each other.

Referring to FIG. 4B, first holding cabinet 400 and second holding cabinet 402 in communication with each other are schematically shown. Each user interface 102 is in communication with an interface controller 105 that has one or more user interface control boards 106. User interface control board 106 has a processor 106a and a memory 106b. The x-y coordinates of a touch, for example, by a finger of a user, are sensed using projected capacitive technology on an interface surface 103, for example, a glass surface, of the touch screen of user interface 102. If the touch is removed, then the touch is sensed by the touch screen of user interface 102 as a tap or, in other words, was simply a press. The detection of the x-y coordinates of the touch sensed by the touch screen of user interface 102 are sent to interface processor 106a in real time. The touch screen of user interface 102 can sense multiple touches, for example, more than one touch simultaneously contacting the touch screen of user interface 102. The detection of the x-y coordinates of each touch sensed by the touch screen of user interface 102 are sent to interface processor 106a in real time.

Heater 20 is in electrical communication with a temperature control controller 107. Temperature control controller 107 has a temperature control board 108. Temperature control board 108 has a temperature control processor 108a and temperature control memory 108b. Temperature control controller 107 controls the state (on/off) and optionally the amount of power supplied to heater 20 as needed, to keep any food products in tray 14 warm. Temperature control processor 108a monitors and controls the temperature of individual bins 12 with heaters 20. Temperature set points can be sent from interface processor 106a, and additional heater on-time or reduced power or reduced heater on-time can be supplied to heaters 20 as needed. Optionally, the temperature values of heated surfaces 20 can be reported from temperature control processor 108a back to interface processor 106a. Temperature could also be managed by a simple algorithm, which adjusts the percentage of time the heater is powered on and off relative to what temperature setting is set in the control. Thus, in this embodiment, interface processor 106a in first holding cabinet 400 can be an aggregator of the data collected by the other processors, including temperature control processor 108a, in first holding cabinet 400. Interface processor 106a in second holding cabinet 402 can be an aggregator of the data collected by the other processors, including temperature control processor 108a, in second holding cabinet 402. Interface controller 105, temperature control controller 107, and heater 20 in first holding cabinet 400 are all in electrical communication with one another. Interface controller 105, temperature control controller 107, and heater 20 in second holding cabinet 402 are all in electrical communication with one another.

When multiple cabinets 10 are in the same location, the cabinets 10 may be connected to one another to allow communication of information between separate cabinets 10 in a network and to the internet, for example, first holding cabinet 400 and second holding cabinet 402. Referring to FIG. 4B, first holding cabinet 400 and second holding cabinet 402 each need to be connected in electronic communication. This can be through wired connection, such as ethernet or i-squared-c communication, or it can be over any form of wireless connection, such as 802.11n wifi or tcp-ip. First holding cabinet 400 and a second holding cabinet 402 use this communication to share information about what is being held, in which device, in which location, and what timing information is available. First holding cabinet 400 communicates data to second holding cabinet 402 as shown by arrow 404 and second holding cabinet 402 communicates data to first holding cabinet 400 as shown by arrow 406 either through wireless communication (i.e. WiFi over 802.11a/b/g/n) or through wired communication. First holding cabinet 400 and second holding cabinet 402, for example, use USB WiFi dongles or WiFi embedded into control boards to communicate by wireless communication. In particular, each cabinet 10 can have one or multiple user interfaces 102. User interfaces 102 have the touchscreens which then communicate to user interface control board 106 which maintains onboard processor 106a and memory 106b. Each user interface 102 has the touchscreen and user interface control board 106. User interface control boards 106 can communicate with each other through wired or wireless communication. User interface control boards 106 can each also communicate to the other devices in a system—including temperature control boards 108, speakers, and in this instance, USB Wi-Fi dongle for wireless communication. Alternatively, user interface 102 could have onboard Wi-Fi, Bluetooth or other communication, but in the system shown in FIG. 4B, user interfaces 102 talk to each other. Additionally, when user interfaces 102 are master UI units, they are each able to talk to temperature control board 108, as well as USB WiFi communication devices (not shown). In turn, each USB WiFi communication device talks to other cabinets 10 within the network, thereby allowing cabinets 10 to communicate with one another.

Referring to FIG. 5, user interface 102 of first holding cabinet 400 displays on the touchscreen a screen divided into discrete sections 502, 504, 506, 508, 510, 512, 514. The touchscreen of first holding cabinet 400 has seven sections such that each of sections 502, 504, 506, 508, 510, 512, 514 displays information related to one of the seven tray bins 12. Referring back to FIG. 4A, a bin 408 that is one of bins 12 is associated with section 502. A bin 410 that is one of bins 12 is associated with section 504. A bin 412 that is one of bins 12 is associated with section 506. A bin 414 that is one of bins 12 is associated with section 508. A bin 416 that is one of bins 12 is associated with section 510. A bin 418 that is one of bins 12 is associated with section 512. A bin 420 that is one of bins 12 is associated with section 514. The sections 502, 504, 508, 510, 512, 514, are shown as having seven sections for seven corresponding bins 12; however, first holding cabinet 400 could have a greater or less number sections and bins for different sized cabinets. The tiled screen of the touchscreen of user interface 102 can be one screen option, for example, home screen.

Sections 502, 504, 506, 508, and 514 each display a displayed food product timer button 522. Each displayed food product timer button 522 includes a product identifier 524 and status identifier 526. Product identifier 524 is, for example, a product name, abbreviation, other identifying symbol, or combination thereof. Status identifier 526 is, for example, "Ready" indicating that the corresponding displayed food product timer button 522 can be pressed to activate a timer. Each of sections 502, 504, 506, 508, and 514 have an indicator, for example a light grey color, indicating a ready state in which a timer has not been activated or idle state. Sections 502, 504, 506, 508, and 514 in the ready state can be selected by a tap, for example, a finger of a user contacts surface 103 of first holding cabinet 400 within one of sections 502, 504, 506, 508, and 514. The detection of the x-y coordinates of the touch sensed by the touch screen of user interface 102 by the tap are sent to interface processor 106a of first holding cabinet 400 that determines the location of the tap, for example, within one of sections 502, 504, 506, 508, and 514. When sections 502, 504, 506, 508, and 514 are tapped, then a timer will commence similar to sections 510 and 512 described herein.

Section 510 displays product identifier 524 and a first timer 528 and section 512 displays product identifier 524 and a second timer 530. After a finger of a user tapped surface 103 within section 510, user interface 102 displays a first indicator 532, for example, a change of the color of section 510 such as a green color, on the touchscreen that indicates section 510 has been selected by the tap of the finger and user interface 102 of first holding cabinet 400 displays numbers of first timer 528 on the touchscreen in section 510. The finger is one finger that generates a tap so that x-y coordinates of the tap are sensed on interface surface 103 of the touch screen of user interface 102 of first holding cabinet 400. The detection of the x-y coordinates of the tap sensed by the touch screen of user interface 102 are sent to interface processor 106a of first holding cabinet 400. First indicator 532 indicates a time of first timer 528, for example, by the color of first indicator 532 changing to a color 534 from right to left with the time of first timer 528. For example, the color of first indicator 532 covers all of section 510 when the timer begins and decreases in size until first timer 528 expires and first indicator 532 is no longer displayed in section 510.

After a finger of a user tapped surface 103 within section 512, user interface 102 displays a second indicator 536, for example, a change of the color of section 512 such as a green color, on the touchscreen that indicates section 512 has been selected by the tap of the finger and user interface 102 displays numbers of second timer 530 on the touchscreen in section 512. The finger is one finger that generates a tap so that x-y coordinates of the tap are sensed on interface surface 103 of the touch screen of user interface 102 of first holding cabinet 400. The detection of the x-y coordinates of the tap sensed by the touch screen of user interface 102 are sent to interface processor 106a of first holding cabinet 400. Second indicator 536 indicates a time of second timer 530, for example, by the color of second indicator 536 changing to a color 538 from right to left with the time of second timer 530. For example, the color of second indicator 536 covers all of section 512 when the timer begins and decreases in size until second timer 530 expires and second indicator 536 is no longer displayed in section 512.

First indicator 532 can be different than second indicator 536 to indicate which timer is the oldest for the same product identifier 524. For example, first indicator 532 can be yellow and second indicator 536 can be white to indicate to a user that the food in tray 14 corresponding to section 510 should be used before the food in tray 14 corresponding to second section 512. A user taps surface 103 within section 510 when first timer 528 is displayed in a timer button so that user interface 102 displays timer reset options. The timer reset options include a first option to confirm to reset that deactivates first timer 528, and, after first timer 528 is deactivated, user interface 102 of first holding cabinet 400 displays a displayed food product timer button 522 in section 510. The timer reset options include a second option to cancel to leave first timer 528 running. A user taps surface 103 within section 512 when second timer 530 is displayed in a timer button so that user interface 102 displays timer reset options. The timer reset options include a first option to confirm to reset that deactivates second timer 530, and, after second timer 530 is deactivated, user interface 102 of second holding cabinet 402 displays displayed food product timer button 522 in section 512. The timer reset options include a second option to cancel to leave second timer 530 running. Accordingly, first cabinet has two active holding timers, namely, first timer 528 and second timer 530.

As shown in FIG. 4A, a tray 436 is in bin 416. A tray 438 is in bin 418. Trays 436 and 438 are each one of trays 14 having food, for example, biscuits therein. The finger of the user should tap surface 103 within section 510 when tray 436 is initially placed in bin 416. First timer 528 indicates a time before food in tray 436 becomes too old to meet quality standards and should be discarded. The finger of the user should tap surface 103 within section 512 when tray 438 is initially placed in bin 418. Second timer 530 indicates a time before food in tray 438 becomes too old to meet quality standards and should be discarded.

Referring to FIG. 6, user interface 102 of second holding cabinet 402 displays on the touchscreen a screen divided into discrete sections 602, 604, 606, 608, 610, 612, 614. The touchscreen of second holding cabinet 402 has seven sections such that each of sections 602, 604, 606, 608, 610, 612, 614 displays information related to one of the seven tray bins 12. A bin 422 that is one of bins 12 is associated with section 602. A bin 424 that is one of bins 12 is associated with section 604. A bin 426 that is one of bins 12 is associated with section 606. A bin 428 that is one of bins 12 is associated with section 608. A bin 430 that is one of bins 12 is associated with section 610. A bin 432 that is one of bins 12 is associated with section 612. A bin 434 that is one of bins 12 is associated with section 614. The sections 602, 604, 606, 608, 610, 612, 614, are shown as having seven sections for seven corresponding bins 12; however, second holding cabinet 400 could have a greater or less number sections and bins for different sized cabinets. Accordingly, first holding cabinet 400, shown in FIG. 5, and second holding cabinet 402, shown in FIG. 6, together have two timers that are active simultaneously, namely, first timer 528 and second timer 530.

Sections 602, 604, 606, 608, 610, 612, 614 each display a displayed food product timer button 622. Each displayed food product timer button 622 includes a product identifier 624 and status identifier 626. Product identifier 624 is, for example, a product name, abbreviation, other identifying symbol, or combination thereof. Status identifier 626 is, for example, "Ready" indicating that the corresponding displayed food product timer button 622 can be pressed to activate a timer. Each of sections 602, 604, 606, 608, 610, 612, 614 have an indicator, for example a light grey color, indicating a ready state, or idle state, in which a timer has not been activated. Sections 602, 604, 606, 608, 610, 612, 614 in the ready state can be selected by a tap, for example, a finger of a user contacts surface 103 within one of sections 602, 604, 606, 608, 610, 612, 614. The detection of the x-y coordinates of the touch sensed by the touch screen of user interface 102 of second holding cabinet 402 by the tap are sent to interface processor 106a of second holding cabinet 402 that determines the location of the tap, for example, within one of sections 602, 604, 606, 608, 610, 612, 614. When sections 602, 604, 606, 608, 610, 612, 614 are tapped, then a timer will commence similar to sections 510 and 512 described herein.

Referring to FIG. 7A, a user can place tray 440 in bin 430. Tray 440 is one of trays 14. Referring to FIG. 8, upon placing tray 440 in bin 430 a user should then tap surface 103 of second holding cabinet 402 within section 610 using a single finger 800. When single finger 800 taps surface 103 of second holding cabinet 402 within section 610, user interface 102 displays a third indicator 632, for example, a change of the color of section 610 such as a green color, on the touchscreen that indicates section 610 has been selected by the tap of single finger 800 and user interface 102 of second holding cabinet 402 displays numbers of a third timer 628 on the touchscreen in section 610 instead of status identifier 626. Single finger 800 is one finger that generates a tap so that x-y coordinates of the tap are sensed on interface surface 103 of the touch screen of user interface 102 of second holding cabinet 402. The detection of the x-y coordinates of the tap sensed by the touch screen of user interface 102 are sent to interface processor 106a of second holding cabinet 402. Third indicator 632 indicates a time of third timer 628, for example, by the color of third indicator 632 changing to a color 634 from right to left with the time of third timer 628. For example, the color of third indicator 632 covers all of section 610 when the timer begins and decreases in size until third timer 628 expires and third indicator 632 is no longer displayed in section 610. Third timer 628 indicates a time before food in tray 440 becomes too old to meet quality standards and should be discarded. Accordingly, first holding cabinet 400, shown in FIG. 7B, and second holding cabinet 402, shown in FIG. 8, together have three timers that are active simultaneously, namely, first timer 528, second timer 530 and third timer 628.

Referring to FIG. 9A, a user can remove tray 436 from bin 416 of first holding cabinet 400 and place tray 436 in bin 428 of second holding cabinet 402. Upon placing tray 436 in bin 428 of second holding cabinet 402, referring to FIG. 10, a user should use multiple fingers 1000, 1002 simultaneously to tap surface 103 of second holding cabinet 402 within section 608. When multiple fingers 1000, 1002 simultaneously tap surface 103 of second holding cabinet 402 within section 608, user interface 102 displays a list 1004 on the touchscreen of user interface 102. The fingers are more than one finger that generates a tap, as shown in FIG. 10, multiple fingers 1000, 1002 are two fingers, so that x-y coordinates of each of the two taps are sensed on interface surface 103 of the touch screen of user interface 102 of second holding cabinet 402. The detection of the x-y coordinates of the taps by multiple fingers 1000, 1002 that are sensed by the touch screen of user interface 102 are sent to interface processor 106a of second holding cabinet 402. User interface 102 of second holding cabinet 402 also displays a fourth indicator 1007, for example, a change of the color of section 608 such as a white color, on the touchscreen that indicates section 608 has been selected by the multiple taps of multiple fingers 1000, 1002.

The data needed to generate list 1004 can be continuously communicated between first holding cabinet 400 and second holding cabinet 402 to prevent delays, or, upon multiple fingers 1000, 1002 tapping surface 103 of second holding cabinet 402 within section 608, a request can be sent to the network of holding cabinets, in this case to first holding cabinet 400, for all information on allowable timer transfers. First holding cabinet 400 and second holding cabinet 402 communicate to share information about (1) what is being held, for example, as indicated by product identifiers 524, 624, (2) in which device, namely, first holding cabinet 400 or second holding cabinet 402, (3) in which location, namely, bins 408, 410, 412, 414, 416, 418, 420, 422, 424, 426, 428, 430, 432, 434 that correspond to product identifiers 524, 526 in each section 502, 504, 506, 508, 510, 512, 514, 602, 604, 606, 608, 610, 612, 614, and (4) what timing information is available, for example, any active timers in each section 502, 504, 506, 508, 510, 512, 514, 602, 604, 606, 608, 610, 612, 614 that correspond to bins 408, 410, 412, 414, 416, 418, 420, 422, 424, 426, 428, 430, 432, 434. Alternatively, the data needed to generate list 1004 can be continuously communicated between first holding cabinet 400 and second holding cabinet 402 through a server or cloud storage, or, upon multiple fingers 1000, 1002 tapping surface 103 of second holding cabinet 402 within section 608, a request can be sent from second holding cabinet 402 to the server or cloud storage for all information on allowable timer transfers where the data needed to generate list 1004 can be continuously communicated between first holding cabinet 400 and the server or cloud storage and between second holding cabinet 402 and the server or cloud storage.

List 1004 displays one or more list timer buttons 1006. List timer buttons 1006 are the active timers that can be selected to be transferred and displayed in section 608. List timer buttons 1006 each correspond to an active timer in first holding cabinet 400, shown in FIG. 7B, and second holding cabinet 402, shown in FIG. 8, namely, first timer 528, second timer 530 and third timer 628. The specific settings that determine if active timers first timer 528, second timer 530 and third timer 628, are allowable for transfer can be setup in the settings, for example, predetermined settings that can be defined in controller 105 by user input. The parameters used to determine if a product, for example, the product in tray 436, that is eligible for transfer to one of bins 408, 410, 412, 414, 416, 418, 420, 422, 424, 426, 428, 430, 432, 434, for example, include temperature of a bin referred to as shelf temperature, if a lid of any of several varieties is used to cover tray 436, and the physical size of tray 436. Bins 408, 410, 412, 414, 416, 418, 420, 422, 424, 426, 428, 430, 432, 434 may each have more than one heater that can be independently controlled. Accordingly, a size of tray 436 determines how many heaters need to be controlled to be the same temperature to heat tray 436. For example, if tray 436 is a large pan of biscuits it may cover over two or more heaters, and both heaters will run at the same temperature. Another example is if tray 436 is a small pan of breakfast sausage it may cover over only one heater that will run at a predetermined heating temperature while one or more of the other heaters will be deactivated or activated at a predetermined idle temperature.

First list timer button 1008 corresponds to first timer 528. First list timer button 1008 displays product identifier 524, first timer 528, first indicator 532 and color 534. Second list timer button 1010 displays product identifier 524, second timer 530, second indicator 536 and color 538. Third list timer button 1012 displays product identifier 624, third timer 628, second indicator 632 and color 634 of second indicator 632. List 1004 also displays indicia 1014. Indicia 1014 includes instructions on top of list timer buttons 1006 that reads "Select Timer to Transfer:".

While the touchscreen of user interface 102 of second holding cabinet 402 displays list 1004, as shown in FIG. 10, the touchscreen of user interface 102 of first holding cabinet 400 continues to display first timer 528 in section 510 and second timer 530 in section 512, as shown in FIG. 9. While the touchscreen of user interface 102 of second holding cabinet 402 displays list 1004, as shown in FIG. 10, third timer 628 is simultaneously displayed in section 610.

Figures 11, 12:
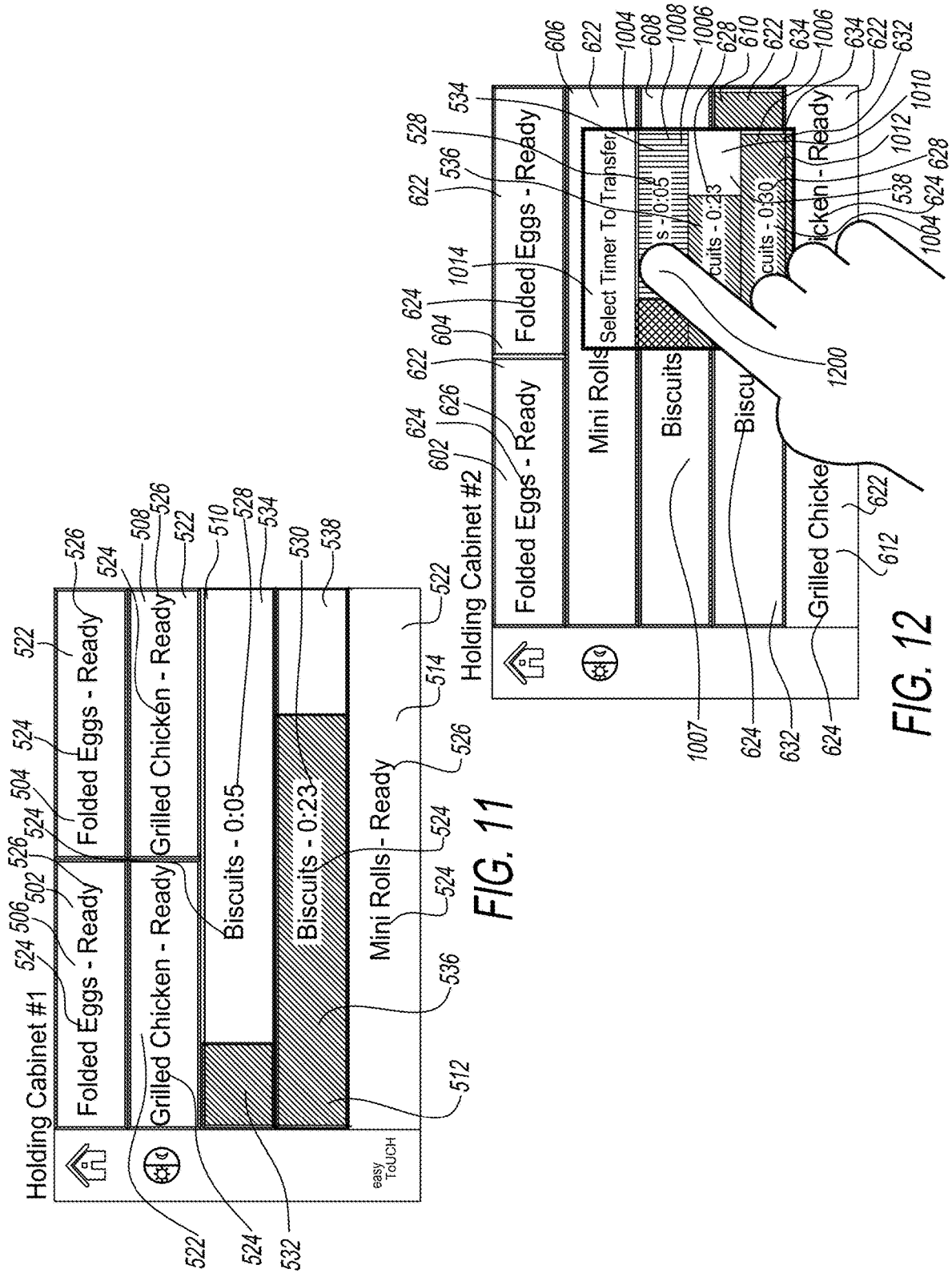
FIG. 11 is a screenshot of the interface of the first holding cabinet illustrating the system and method for time transfer.
FIG. 12 is a screenshot of the interface of the second holding cabinet illustrating the system and method for time transfer.

Referring to FIG. 12, a single finger 1200 of a user taps surface 103 of second holding cabinet 402 within first list timer button 1008. Single finger 1200 is one finger that generates a tap so that x-y coordinates of the tap are sensed on interface surface 103 of the touch screen of user interface 102 of second holding cabinet 402. The detection of the x-y coordinates of the tap sensed by the touch screen of user interface 102 are sent to interface processor 106a of second holding cabinet 402. After single finger 1200 of the user tapped surface 103 of second holding cabinet 402 within first list timer button 1008, user interface 102 of second holding cabinet 402 communicates with user interface 102 of first holding cabinet 400 to transfer first timer 528 from first holding cabinet 400, which is associated with bin 416, to second holding cabinet 402 to be associated with bin 428. Alternatively, user interface 102 of second holding cabinet 402 communicates with user interface 102 of first holding cabinet 400 through the server or cloud storage to transfer first timer 528 from first holding cabinet 400, which is associated with bin 416, to second holding cabinet 402 to be associated with bin 428. While user taps surface 103 of second holding cabinet 402 within first list timer button 1008, as shown in FIG. 11, the touchscreen of user interface 102 of first holding cabinet 400 continues to display first timer 528 in section.

Referring to FIG. 14, after single finger 1200 of the user tapped surface 103 of second holding cabinet 402 within first list timer button 1008, list 1004 is no longer displayed on the touch screen of user interface 102 of second holding cabinet 402 and first timer 528 and product identifier 524 that was previously displayed in section 510 on the touch screen of user interface 102 of first holding cabinet 400 is transferred and displayed in section 608 of the touch screen of user interface 102 of second holding cabinet 402 thereby first timer 528 that was associated with bin 416 is transferred so that first timer 528 is associated with bin 428. In the case that the shelf temperature setting was different for tray 436, upon transferring first timer 528, a temperature in bin 428 would also change to the new setting. Thus, first timer 528 that indicates the time before food in tray 436 becomes too old to meet quality standards and should be discarded can move with tray 436 to second holding cabinet 402. When first timer 528 and product identifier 524 are transferred and displayed in section 608 of the touch screen of user interface 102 of second holding cabinet 402, as shown in FIG. 13, section 510 of the touch screen of user interface 102 of first holding cabinet 400 displays product identifier 524 and status identifier 526, for example, "Ready" indicating that the corresponding displayed food product timer button 622 can be pressed to activate a new timer by a single touch or transfer a timer to section 510 by multiple touches.

Upon expiration of first timer 528, second timer 530 and third timer 628, an alert that indicates the timer has expired is displayed in section 510, section 512 and section 608, respectively. The alert may be displayed for a predetermined amount of time prior to deactivation of the alert or a tap of a user may deactivate the alert. After deactivation of the alert, product identifier 524 and status identifier 526 indicating an idle state displays in first timer 528 and second timer 530, and product identifier 624 and status identifier 626 indicating an idle state displays in third timer 628.

Alternatively, second holding cabinet 402 is not in communication with first holding cabinet 400 or any other holding cabinets. In this alternative, referring back to FIG. 7A, a user can remove tray 440 from bin 430, and, instead of tray 436, the user can place tray 440 in bin 428. Since second holding cabinet 402 is not in communication with any other holding cabinets in this alternative, upon the user using multiple fingers 1000, 1002 to simultaneously tap surface 103 of second holding cabinet 402 within section 608, list 1004 would only display third list timer button 1012 for third timer 628. A user could then use a single finger to tap surface 103 of second holding cabinet 402 within third list timer button 1012. Single finger 1200 is one finger that generates a tap so that x-y coordinates of the tap are sensed on interface surface 103 of the touch screen of user interface 102 of second holding cabinet 402. The detection of the x-y coordinates of the tap sensed by the touch screen of user interface 102 are sent to interface processor 106a of second holding cabinet 402, and, then, list 1004 is no longer displayed on the touch screen of user interface 102 of second holding cabinet 402 and third timer 628 and product identifier 624 that was previously displayed in section 610 is transferred and displayed in section 608 of the touch screen of user interface 102 of second holding cabinet 402 thereby third timer 628 that was associated with bin 430 is transferred so that third timer 628 is associated with bin 428. Thus, third timer 628 that indicates the time before food in tray 440 becomes too old to meet quality standards and should be discarded can move with tray 440 from bin 430 to bin 428. When third timer 628 and product identifier 624 are transferred and displayed in section 608 of the touch screen of user interface 102 of second holding cabinet 402, section 610 displays product identifier 624 and status identifier 626, for example, "Ready" indicating that the corresponding displayed food product timer button 622 can be pressed to activate a new timer by a single touch or transfer a timer to section 610 by multiple touches.

Figure 16:
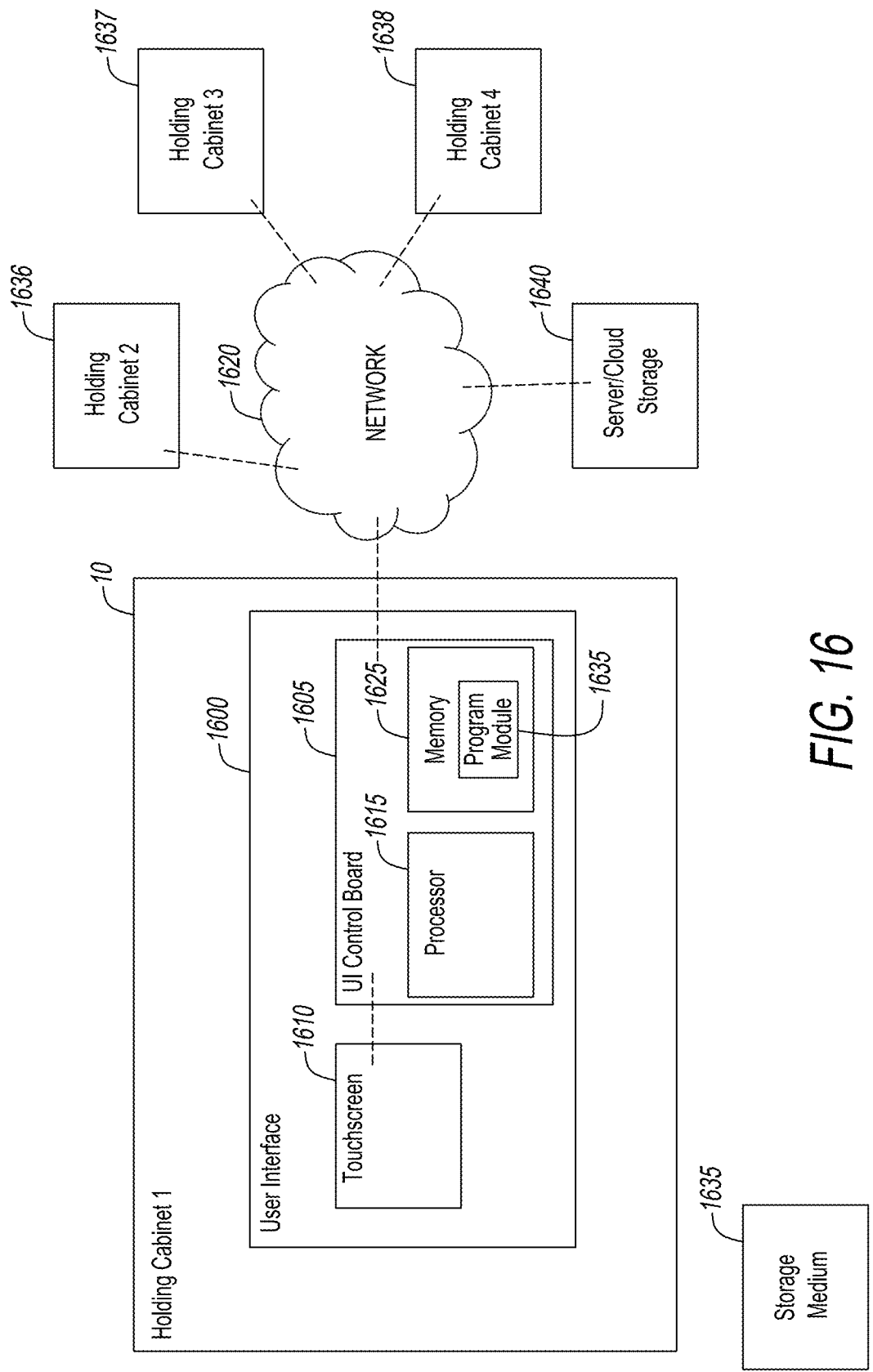
FIG. 16 is a block diagram of a computer system according to the present disclosure.

FIG. 16 is a block diagram of an embodiment of a user interface 1600 of cabinet 10, for employment of the present disclosure. Cabinet 10 may include at least one user interface 1600. User interface 1600 includes a UI control board 1605 coupled to a network 1620, e.g., the Internet, and a touchscreen 1610.

User interface 1600 includes UI control board 1605 that communicates with touchscreen 1610. UI control board 1605 has onboard a processor 1615 and a memory 1625. UI control board 1605 may be implemented on a general-purpose microcomputer. UI control board 1605 can be coupled to other devices via network 1620.

Processor 1615 is configured of logic circuitry that responds to and executes instructions.

Memory 1625 stores data and instructions for controlling the operation of processor 1615. Memory 1625 may be implemented in a random access memory (RAM), a hard drive, a read only memory (ROM), or a combination thereof. One of the components of memory 1625 is a program module 1630.

Program module 1630 contains instructions for controlling processor 1615 to execute the methods described herein. For example, as a result of execution of program module 1630, processor 1615 executes the methods described herein, for example, method 1500. The term "module" is used herein to denote a functional operation that may be embodied either as a stand-alone component or as an integrated configuration of a plurality of sub-ordinate components. Thus, program module 1630 may be implemented as a single module or as a plurality of modules that operate in cooperation with one another. Moreover, although program module 1630 is described herein as being installed in memory 1625, and therefore being implemented in software, it could be implemented in any of hardware (e.g., electronic circuitry), firmware, software, or a combination thereof.

User interface 1600 includes an input device, such as touchscreen 1610, a keyboard or speech recognition subsystem, for enabling a user to communicate information and command selections to processor 1615. User interface 1600 includes, respective, output devices such as touchscreen 1610, a display or a printer. A cursor control such as a mouse, track-ball, or joy stick, can also allow the user to manipulate a cursor on the display for communicating additional information and command selections to processor 1615.

Processor 1615 outputs, to touchscreen 1610, as result of an execution of the methods described herein. Alternatively, processor 1615 could direct the output to remote devices, such as server/cloud storage 1640 and/or other cabinets 1636, 1637, and/or 1638 via network 1620. Such output to touchscreen 1610 in user interface 1600, or additional user interfaces included in cabinets 1636, 1637 and/or 1638 can be timer 1 through timer n related to a specific tray disposed in the respective cabinet, wherein the respective timer 1 through timer n can be moved from one interface to another interface in the same cabinet or other cabinets. The user interface 1600, or additional user interfaces included in cabinets 1636, 1637 and/or 1638, can communicate to each other through wired or wireless communication. They can each also communicate to other connected devices connected to the system—including heater control boards, speakers, and, in this instance, USB Wi-Fi dongle for wireless communication. Alternatively, user interface 1600 could have onboard Wi-Fi, Bluetooth or other communication equipment or devices, but in the illustrated case user interface 1600, or additional user interfaces included in cabinets 1636, 1637 and/or 1638, talk to each other, and are each master UIs which are able to talk to at least one heater control board, as well as the USB WiFi communication device. In addition, the USB WiFi device talks to other cabinets connected to the network and that is how the cabinets 10 in the network communicate with one another.

While program module 1630 is indicated as already loaded into memory 1625, it may be configured on a storage medium 1635 for subsequent loading into memory 1625. Storage medium 1635 can be any conventional storage medium that stores program module 1630 thereon in tangible form. Examples of storage medium 1635 include a floppy disk, a compact disk, a magnetic tape, a read only memory, an optical storage media, universal serial bus (USB) flash drive, a digital versatile disc, or a zip drive. Alternatively, storage medium 1635 can be a random access memory, or other type of electronic storage, located on a remote storage system, for example, in server or cloud storage 1640, and coupled to UI control board 1605 via network 1620.

Figure 15:
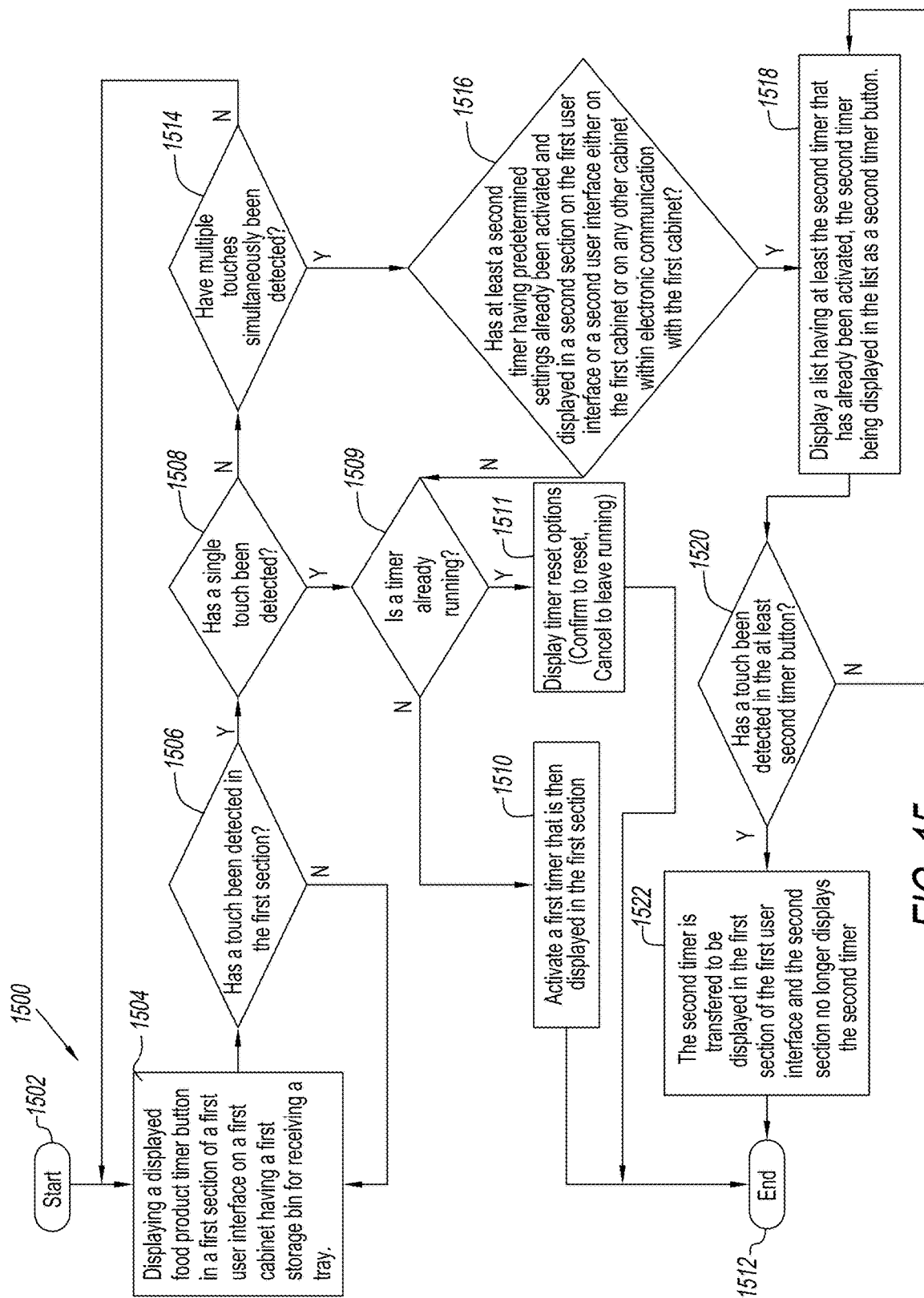
FIG. 15 is a flow chart showing process steps of a controller of the system and method of product for time transfer.

Referring to FIG. 15, a method 1500 that can be used with at least one holding cabinet, for example, first holding cabinet 400 and second holding cabinet 402, is shown. Method 1500 begins at step 1502 and proceeds to step 1504. In step 1504, a displayed food product timer button is displayed in a first section, for example, displayed food product timer button 622 in section 608, of a first user interface, for example, user interface 102 of second holding cabinet 402, on a first cabinet having a first storage bin, for example, bin 428, for receiving a tray. Method 1500 proceeds from step 1504 to step 1506. In step 1506, it is determined if a touch has been detected in the first section, for example, section 608. If a touch has not been detected in the first section, then method 1500 repeats step 1504. If a touch has been detected in the first section, then method 1500 proceeds from step 1506 to step 1508. In step 1508, it is determined if a single touch has been detected in the first section, for example, section 608. If it is determined that a single touch has been detected in the first section, then method 1500 proceeds from step 1508 to step 1509. In step 1509, it is determined if a timer is already running that is associated with the first section. If the timer is not already running, then method 1500 proceeds to step 1510. In step 1510, a first timer is activated that is then displayed in the first section. Method 1500 proceeds from step 1510 to step 1512. In step 1512, method 1500 ends. If the timer is already running, then method 1500 proceeds to step 1511. In step 1511, timer reset options are displayed in user interface 102 including an option to confirm to reset or to cancel to leave the timer running. Method 1500 proceeds from step 1511 to step 1512. In step 1512, method 1500 ends.

If it is determined that a single touch has not been detected in the first section, for example, section 608, then method 1500 proceeds from step 1508 to step 1514. In step 1514, it is determined if multiple touches simultaneously have been detected in the first section. If multiple touches simultaneously have not been detected in the first section, then method 1500 repeats step 1504. If multiple touches simultaneously have been detected in the first section, then method 1500 proceeds from step 1514 to step 1516. In step 1516, it is determined if at least a second timer, for example, first timer 528, having predetermined settings has already been activated and displayed in a second section on the first user interface or a second user interface on a second cabinet, or on any other cabinet within electronic communication with the first cabinet, for example, section 510. If at least a second timer, having predetermined settings has not already been activated and displayed in the second section on the first user interface or the second user interface on the second cabinet, then method 1500 proceeds to step 1509 as described above. If at least a second timer, for example, first timer 528, having predetermined settings has already been activated and displayed in the second section on the first user interface or the second user interface on the second cabinet, for example, section 510, then method 1500 proceeds from step 1516 to step 1518. In step 1518, a list, for example, list 1004, is displayed having at least the second timer, for example, first timer 528, that has already been activated, the second timer being displayed in the list as a second timer button, for example, first list timer button 1008. Method proceeds from step 1518 to step 1520. In step 1520, it is determined if a touch has been detected in the at least second timer button, for example, first list timer button 1008. If a touch has not been detected in the at least second timer button, then method 1500 repeats step 1518. If a touch has been detected in the at least second timer button, for example, first list timer button 1008, then method 1500 proceeds from step 1520 to step 1522. In step 1522, the second timer, for example, first timer 528, is transferred to the first user interface and displayed in the first section, for example, section 608, of the first user interface and the second user interface no longer displays the second timer. Method 1500 proceeds from step 1522 to step 1512. In step 1512, method 1500 ends.

Method 1500 repeats for each displayed food product timer button 522, 622 while at least one of the two of holding cabinets, for example, first holding cabinet 400 and second holding cabinet 402, is operated.

This disclosure is the simplest known method for accomplishing a tray transfer due to utilization of a multi-point touchscreen. This simple and unique method has a setup that includes multiple holding cabinets, each electronically connected to a communication network. Each holding cabinet has active countdown timers associated with trays, pans or containers of food. The touchscreen forms controls on the holding cabinets with the touchscreen split into a table grid with cells representing timers for the pans or containers of food being held within the unit.

It is common to want to move a tray of food from one location to another. This can be within the same holding cabinet or from one holding cabinet to another. All other transfer methods require presses on both the sending and receiving holding cabinet because the control devices are very basic. Typically this can require scrolling or selecting of products as well. An example of this new and unique transfer concept would be to take a pan of food already being held in one cabinet and move it to another cabinet as described herein. The user can touch the timer location on the receiving holding touchscreen where they want to put this pan with multiple fingers, for example two fingers or three fingers, and a list of allowable timers to transfer will be displayed. The user selects the timer that they want to move from the list shown and the timer is moved to this new location. The operator never needs to touch the sending holding cabinet. This is a major advance in simplicity from other transfer methods. By simply touching the screen and selecting the timer desired, a transfer can happen.

For this method to work, the holding cabinets need to be connected in electronic communication. This can be through wired connection, such as ethernet or i-squared-c communication, or it can be over any form of wireless connection, such as 802.11n wifi or tcp-ip. The units use this communication to share information about what is being held, in which device, in which location, and what timing information is available.

Utilizing a touchscreen with multiple-touch-point sensing allows for a basic simple touch with one finger to represent one type of action and touching with multiple points to mean something else. A common example is touching a common phone screen to press a button or select an item, but touching with two fingers and pinching to zoom in or out of a picture. In the present disclosure, however, a simple single finger press is typically used to start or stop a timer in the given location. When sensing two fingers touching the same area, the unit software would know that this represents an incoming timer transfer. Note that for this method the sending cabinet requires no human interaction. Upon sensing a touch from multiple fingers, a list of allowable timers would be displayed.

Allowable timers can be defined in many ways by the operators. These could be done in settings. For instance, the operator could limit the available transfers to only those of the exact same food type, e.g., as identified by the product identifier 524, 624. For instance, a two finger touch in an area holding chicken fingers would only show active chicken finger timers. But it could also be set to allow any food products that have the same shelf temperature, or other criteria as well. Finally, no filtering could exist, which would allow all timers to be transferred to this location. In the case that the shelf temperature setting was different on the food container received, upon transferring the timer, the shelf temperature would also change to the new setting. Two finger touching a timer that does not have any allowable active timers would simply not show a list. When the allowable timer list is generated, it comes from shared information across the communication network between cabinets. This information can be continuously shared to prevent delays or upon activating the multi-point touch a request can be sent to the network for all information on allowable transfers.

The present disclosure having been thus described with particular reference to the preferred forms thereof, it will be obvious that various changes and modifications may be made therein without departing from the spirit and scope of the present invention as defined in the appended claims.

The invention claimed is:

1. A system for storing food products at predetermined temperatures, comprising:
   a first food product receiving holding cabinet having a user interface;
   a first storage bin in the first food product receiving holding cabinet for receiving a tray, the user interface displays a first displayed food product timer button in a first section that is associated with the first storage bin;
   a temperature control device that is in thermal communication with the tray; and
   a controller that, when the first displayed food product timer button is contacted, a list having at least an activated timer is displayed, wherein the activated timer displayed by the user interface is associated with a second storage bin in the first food product receiving holding cabinet or a second food product receiving holding cabinet, the activated timer being selectable by touching the user interface so that the activated timer is a selected timer, the controller transfers the selected timer when the user interface of the first food product receiving holding cabinet is touched to select the selected timer, thereby designating the selected timer for transfer to be associated with the first storage bin, so that a user only has to interact with the first receiving hot food holding cabinet.

2. The system of claim 1, wherein, when the first displayed food product timer button is contacted by a single touch, a first timer is activated that is then displayed in the first section.

3. The system of claim 1, wherein, when the first displayed food product timer button is contacted by multiple touches simultaneously, the list having at least a second timer that is the activated timer that has already been activated is displayed.

4. The system of claim 3, wherein the second timer is displayed in the list as a second timer button, and wherein the user interface is contacted at the second timer button to transfer the second timer that is the selected timer to be displayed in the first section.

5. The system of claim 4, wherein the second timer is displayed by the user interface in a different section than the first section prior to the transfer.

6. The system of claim 4, wherein the second timer is displayed by another user interface of a second food product receiving holding cabinet prior to the transfer.

7. The system of claim 1, wherein the user interface is a touchscreen that forms a plurality of sections including the first section and each section of the plurality of sections displaying displayed food product timer buttons, and wherein the first section displays the first displayed food product timer button.

8. The system of claim 1, wherein the controller communicates with another controller associated with the second food product receiving holding cabinet.

9. The system of claim 8, wherein the controller receives data from the second food product receiving holding cabinet, wherein the data is selected from the group consisting of identification of items being held, location of the items being held, timing information associated with the items being held, and any combination thereof.

10. The system of claim 3, wherein the second timer is displayed in the list as a second timer button and further comprising another timer button, wherein the second timer is displayed by the user interface in a different section than the first section, and wherein the another timer button is associated with another timer displayed by another food product receiving holding cabinet.

11. A method for a system for storing food products at predetermined temperatures, the method comprising:
   providing a food receiving holding cabinet, a storage bin in the food receiving holding cabinet for receiving a tray, and a temperature control device in thermal communication with the tray;
   displaying a displayed food product timer button in a first section of a user interface that can be contacted by a single touch and multiple touches simultaneously;
   contacting the displayed food product timer button by a single touch ti activate a first timer that is then displayed in the first section or by multiple touches simultaneously to display a list having at least a second timer that has already been activated; and
   transferring a selected timer that is the second timer by touching the food receiving holding cabinet, thereby designating the selected timer for transfer to be associated with the storage bin so that a user only has to interact with the receiving hot food holding cabinet.

12. The method of claim 11, further comprising displaying the second timer in the list as a second timer button after the contacting and contacting the user interface at the second timer button so that the second timer is the selected timer to transfer the second timer to be displayed in the first section.

13. The method of claim 11, wherein the second timer is displayed by the user interface in a different section than the first section prior to the transfer.

14. The method of claim 11, wherein the second timer is displayed by another user interface of another food receiving holding cabinet prior to the transfer.

15. The method of claim 11, wherein the user interface is a touchscreen that forms a plurality of sections including the first section and each section of the plurality of sections displaying displayed food product timer buttons, and wherein the first section displays the first displayed food product timer button.

16. The method of claim 11, further comprising communicating with another food receiving holding cabinet and receiving data from the another food receiving holding cabinet, wherein the data is selected from the group consisting of identification of items being held, location of the items being held, timing information associated with the items being held, and any combination thereof.

17. The method of claim 11, further comprising displaying the second timer in the list as a second timer button and further comprising displaying another timer button in the list, wherein the second timer is displayed by the user interface in a different section than the first section, and wherein the another timer button is associated with another timer displayed by another food receiving holding cabinet.

* * * * *